United States Patent
Vinna et al.

(10) Patent No.: US 9,720,564 B1
(45) Date of Patent: Aug. 1, 2017

(54) SYSTEMS AND METHODS FOR DETERMINING USER PREFERENCES USING A GRAPHICAL USER INTERFACE

(71) Applicant: BEATS MUSIC, LLC, San Francisco, CA (US)

(72) Inventors: Fredric Vinna, Stockholm (SE); Rob Sheridan, Los Angeles, CA (US); Michael Trent Reznor, Los Angeles, CA (US); Ayse Kulahci, San Francisco, CA (US); Stephen Garcia, San Francisco, CA (US); James Temple, Hitchin Hertfordshire (GB); Scott Elliot Shaw, Tunbridge Well Kent (GB); Lucio Moreno Rufo, Balham (GB); Scott Plagenhoef, Los Angeles, CA (US)

(73) Assignee: Beats Music, LLC, San Francisco, CA (US)

( * ) Notice: Subject to any disclaimer, the term of this patent is extended or adjusted under 35 U.S.C. 154(b) by 660 days.

(21) Appl. No.: 14/158,654

(22) Filed: Jan. 17, 2014

(51) Int. Cl.
*G06F 3/0482* (2013.01)
*G06F 3/0481* (2013.01)
*G06F 3/0484* (2013.01)

(52) U.S. Cl.
CPC ........ *G06F 3/04817* (2013.01); *G06F 3/0482* (2013.01); *G06F 3/0484* (2013.01)

(58) Field of Classification Search
CPC ... G06F 3/00; G06F 3/01; G06F 3/017; G06F 3/0416; G06F 3/041; G06F 3/048; G06F 3/0481; G06F 3/0482; G06F 3/0484; G06F 3/0488; G06F 3/04883
See application file for complete search history.

(56) References Cited

U.S. PATENT DOCUMENTS

| | | | |
|---|---|---|---|
| 6,426,761 B1* | 7/2002 | Kanevsky | G06F 3/0481 715/764 |
| 9,372,592 B1* | 6/2016 | Goodspeed | G06F 3/0481 |
| 2006/0150215 A1* | 7/2006 | Wroblewski | G06F 3/0236 725/47 |
| 2006/0161863 A1* | 7/2006 | Gallo | G06F 9/4443 715/810 |
| 2007/0079255 A1* | 4/2007 | Gourdol | G06F 3/04817 715/815 |
| 2010/0328224 A1* | 12/2010 | Kerr | G06F 3/04883 345/173 |

(Continued)

*Primary Examiner* — Xiomar L Bautista
(74) *Attorney, Agent, or Firm* — Blank Rome LLP

(57) ABSTRACT

Systems and methods for compiling personal preferences of a user are provided. A method comprises simultaneously displaying a plurality of icons in a clustered arrangement, each icon being assigned to a respective one of a plurality of values; receiving a first input in association with a first icon, the first input indicating a preference for the value assigned to the first icon; adjusting a size of the first icon in response to the first input; redistributing, within the clustered arrangement, the remaining icons to accommodate the size adjustment; receiving a second input in association with a second icon, the second input indicating a dislike for the value assigned to the second icon; deleting, from the clustered arrangement, the second icon in response to the second input; and redistributing, within the clustered arrangement, the remaining icons to fill a space emptied by the deletion.

39 Claims, 24 Drawing Sheets

(56) References Cited

U.S. PATENT DOCUMENTS

| | | | | |
|---|---|---|---|---|
| 2011/0283236 A1* | 11/2011 | Beaumier | ............ | G07F 11/002 715/835 |
| 2011/0302493 A1* | 12/2011 | Runstedler | ........ | G06F 17/30053 715/716 |
| 2012/0066186 A1* | 3/2012 | Wohlert | ............ | G06F 17/30029 707/691 |
| 2013/0325627 A1* | 12/2013 | Kimmerling | ..... | G06F 17/30386 705/14.66 |
| 2014/0115465 A1* | 4/2014 | Lee | ........................... | G06F 3/01 715/716 |
| 2014/0136992 A1* | 5/2014 | Magcale | ................ | G06F 17/30 715/753 |

\* cited by examiner

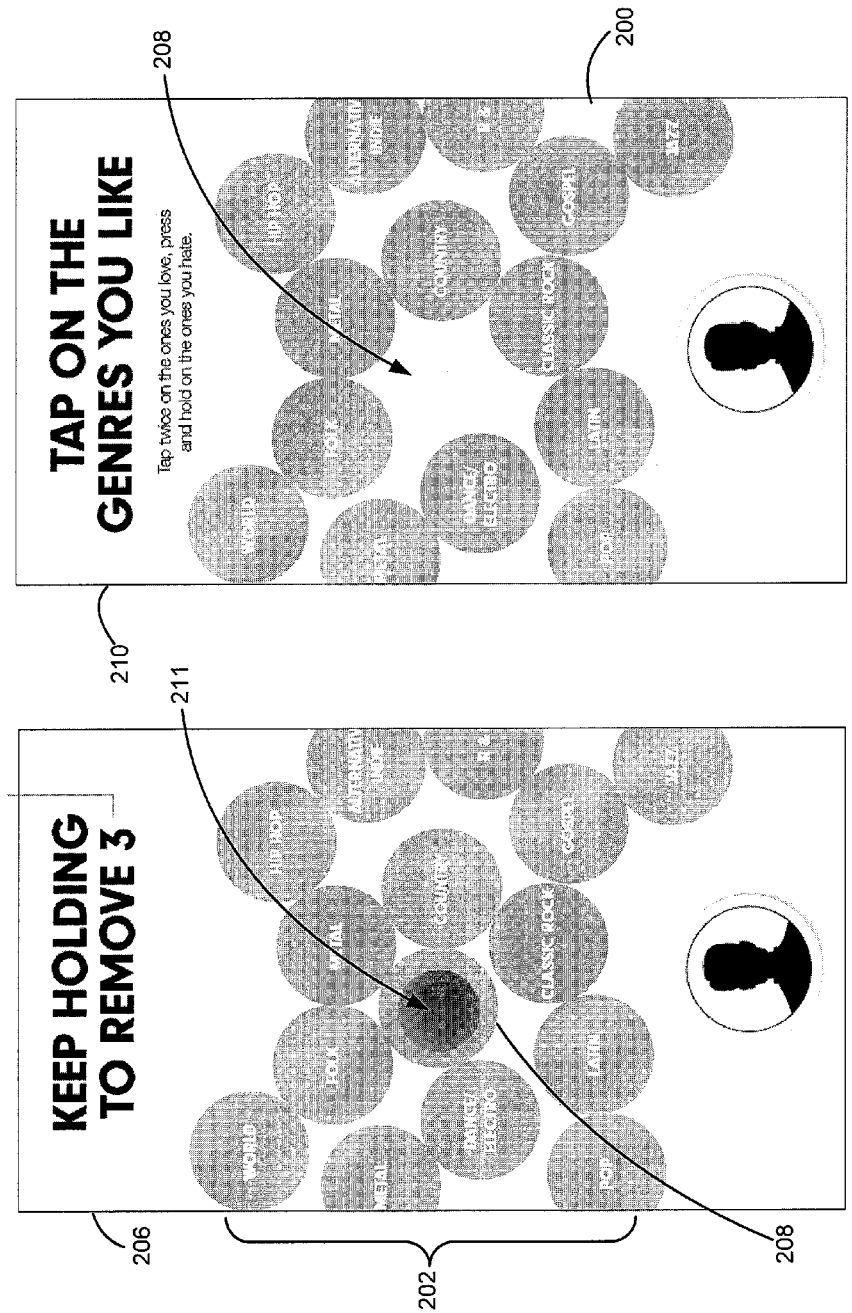

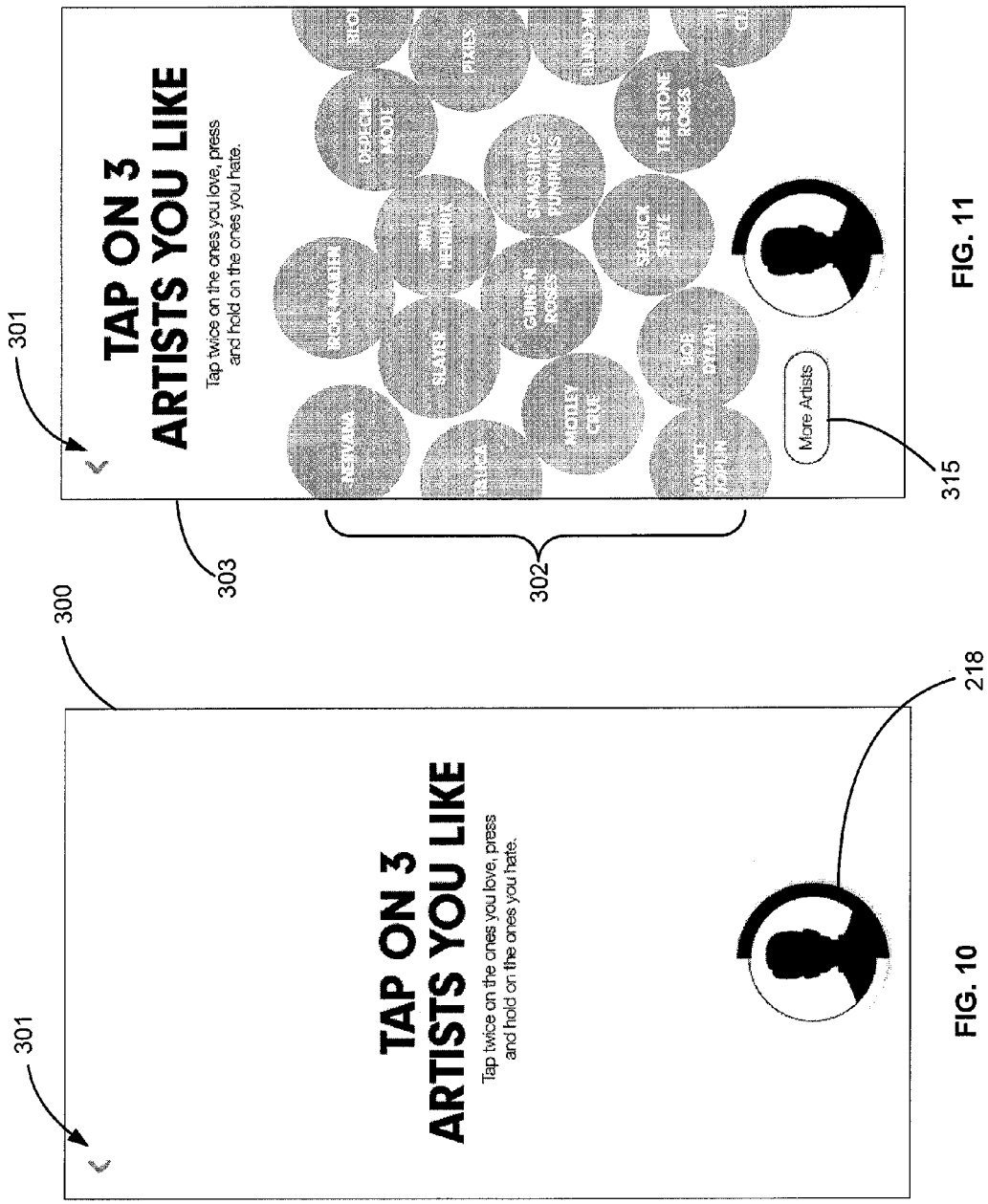

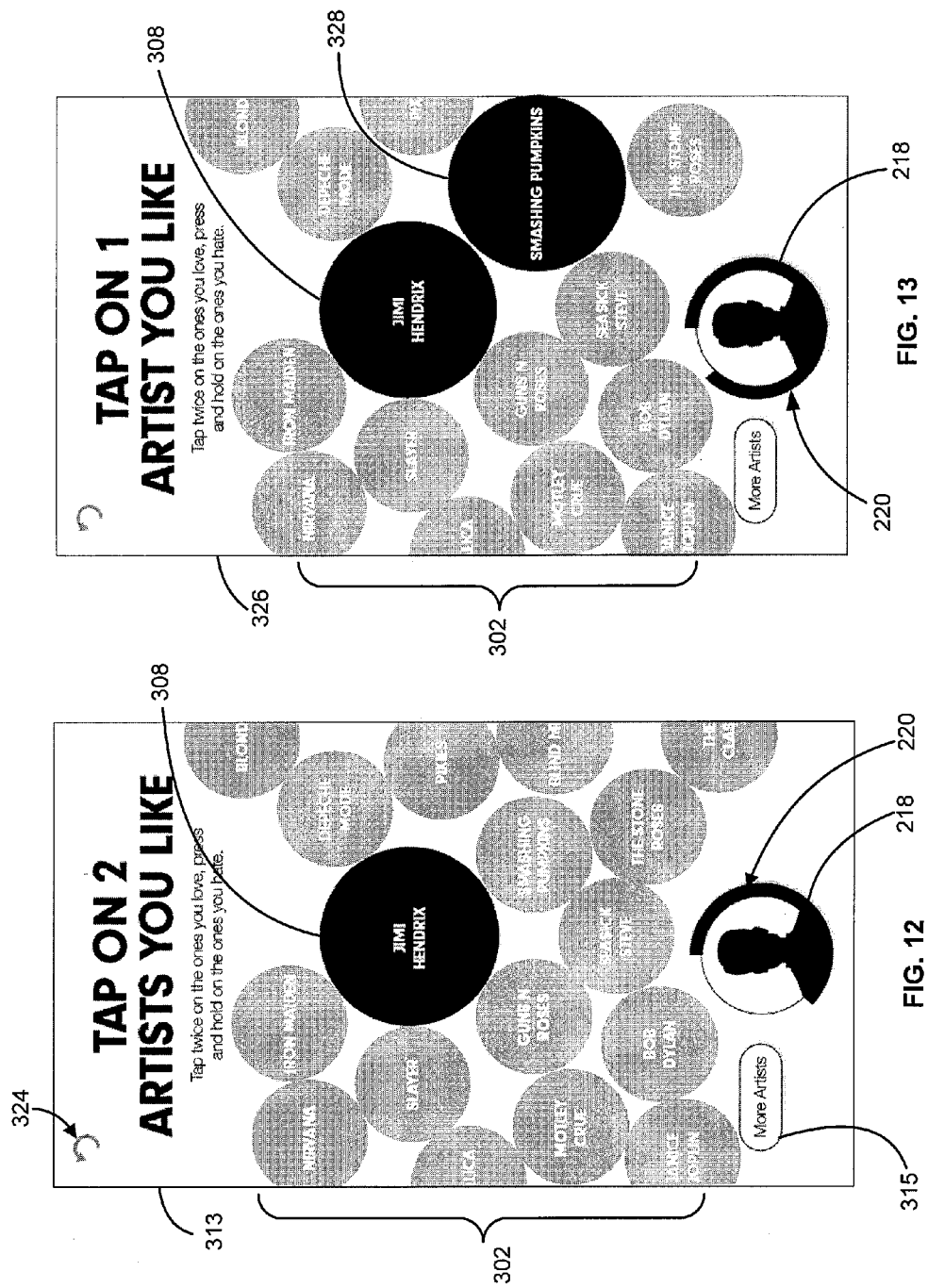

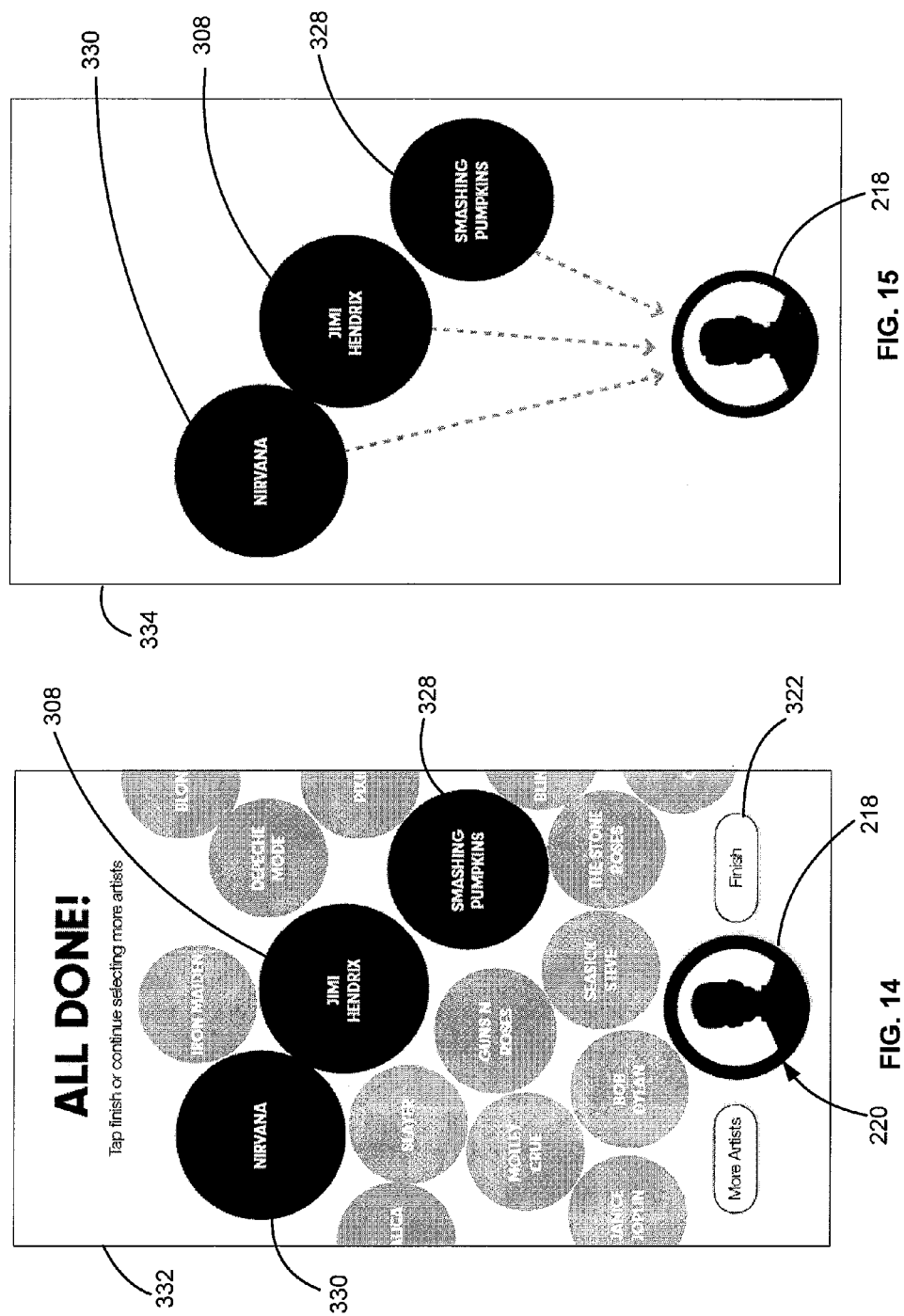

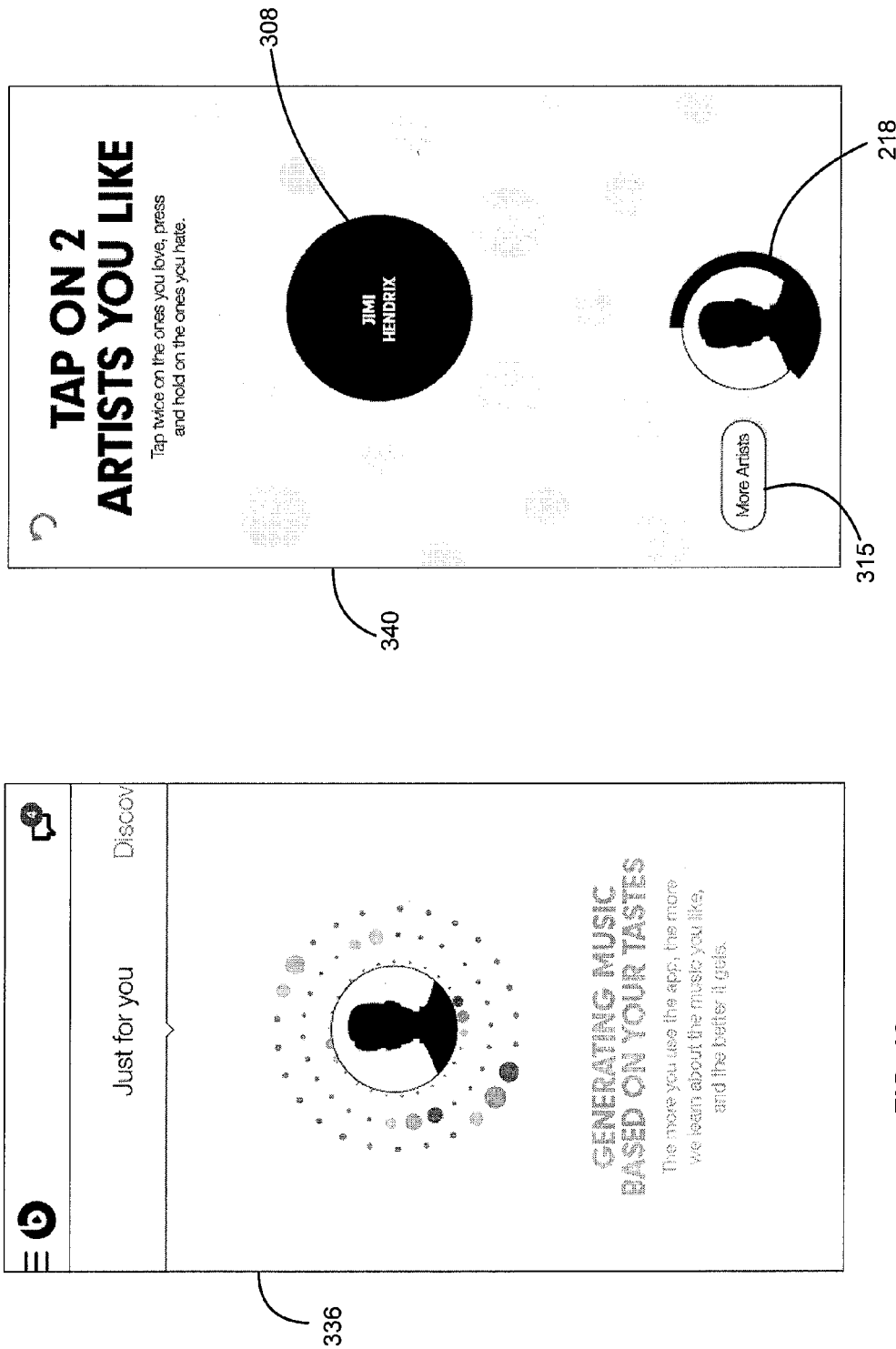

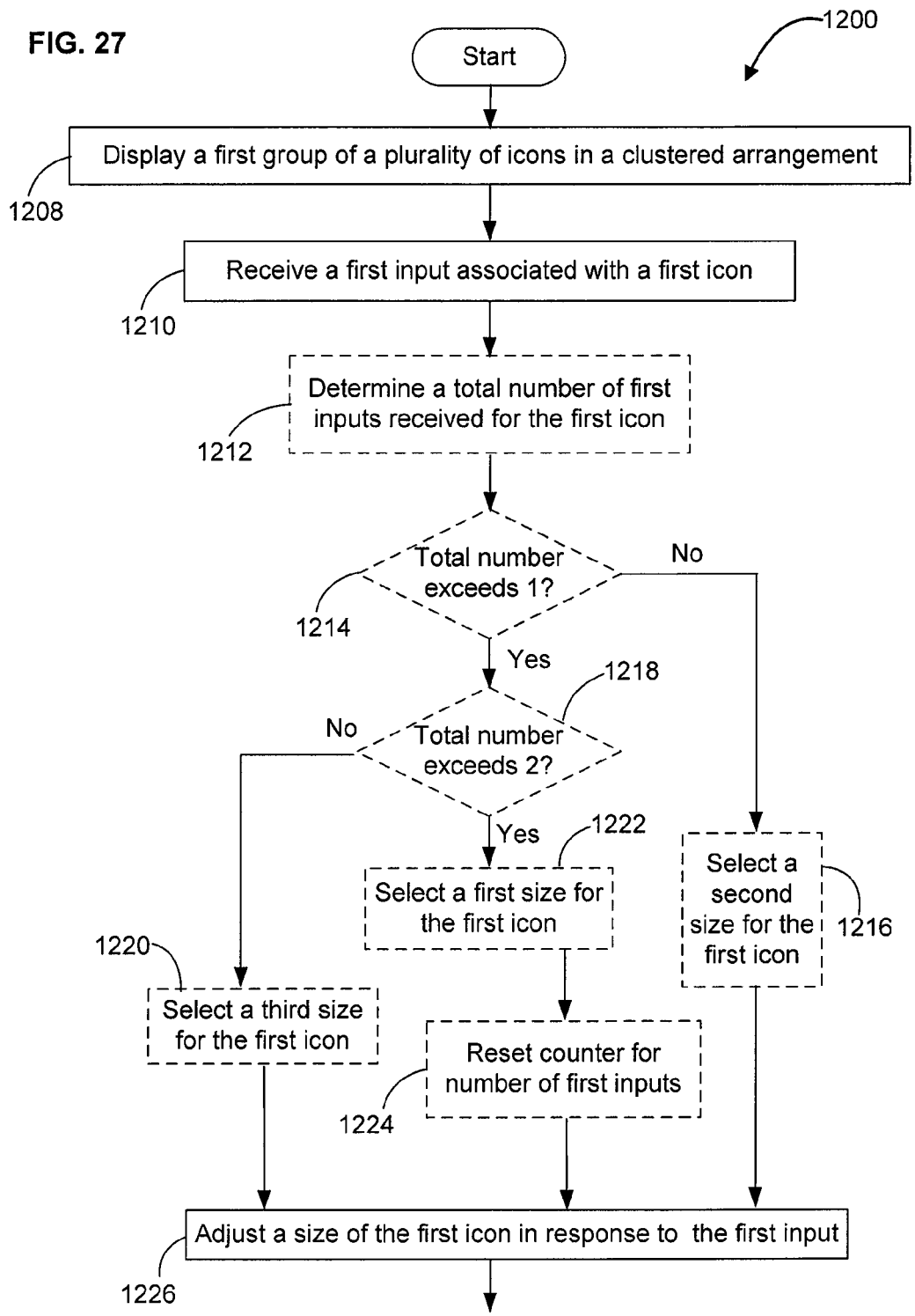

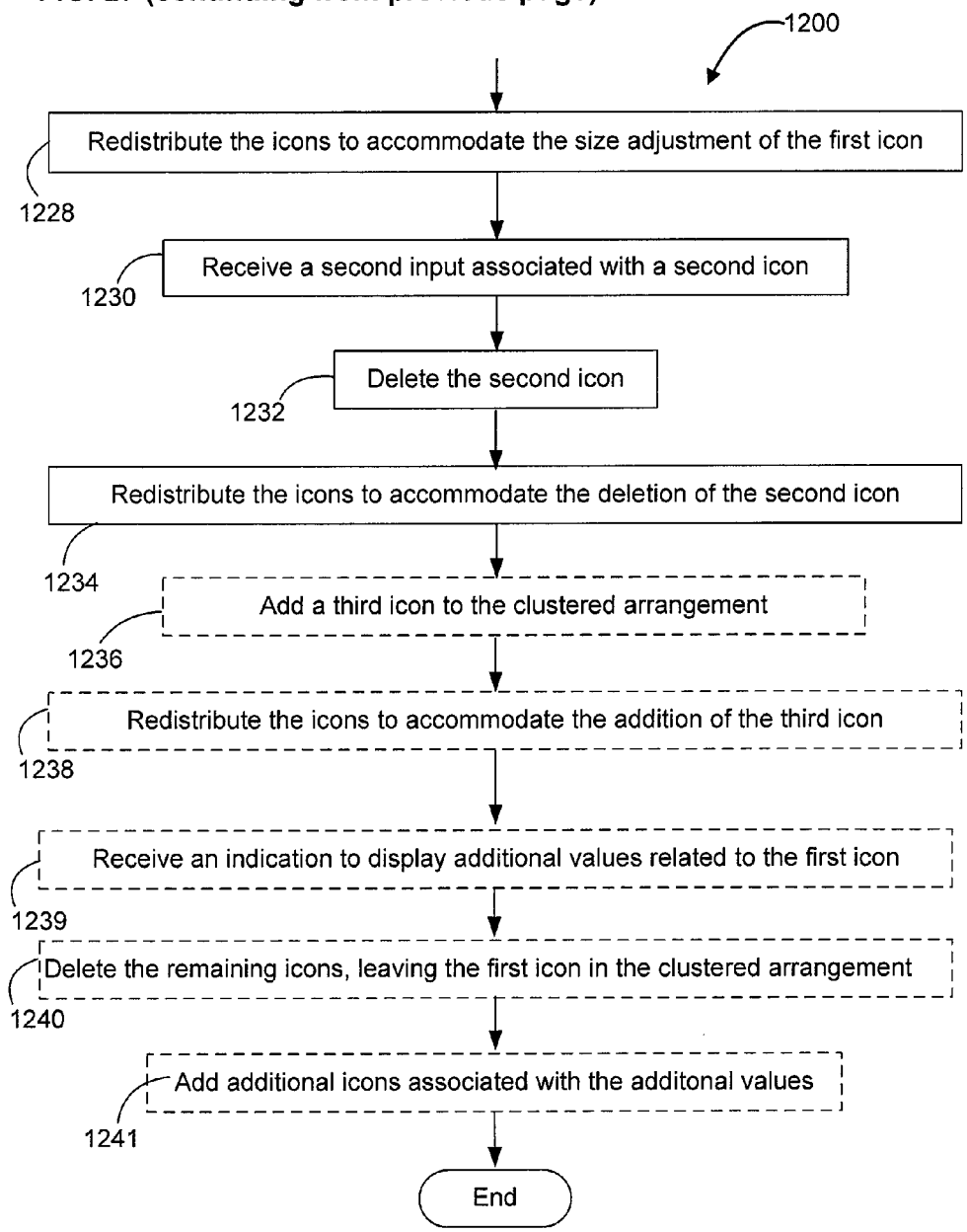

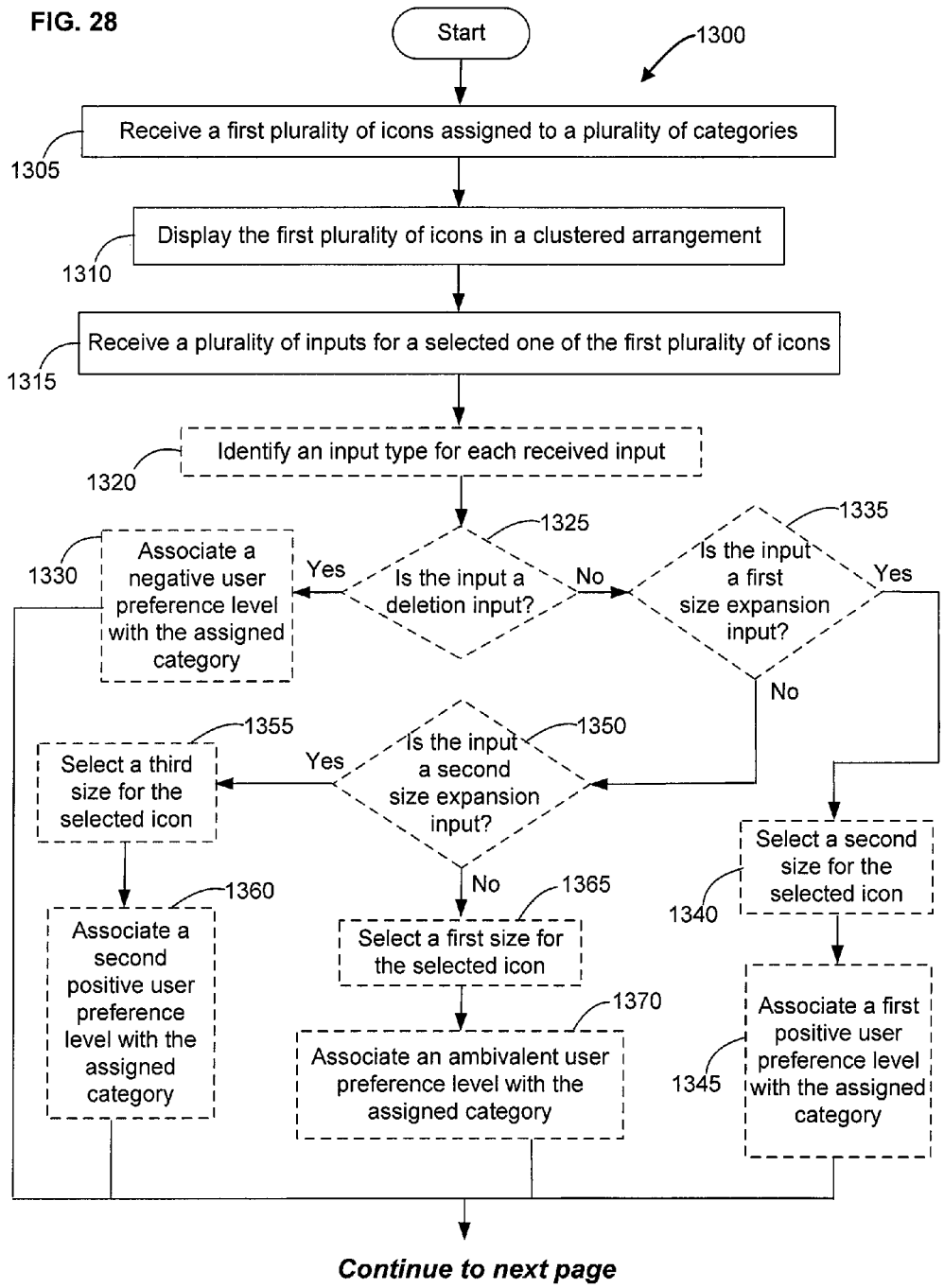

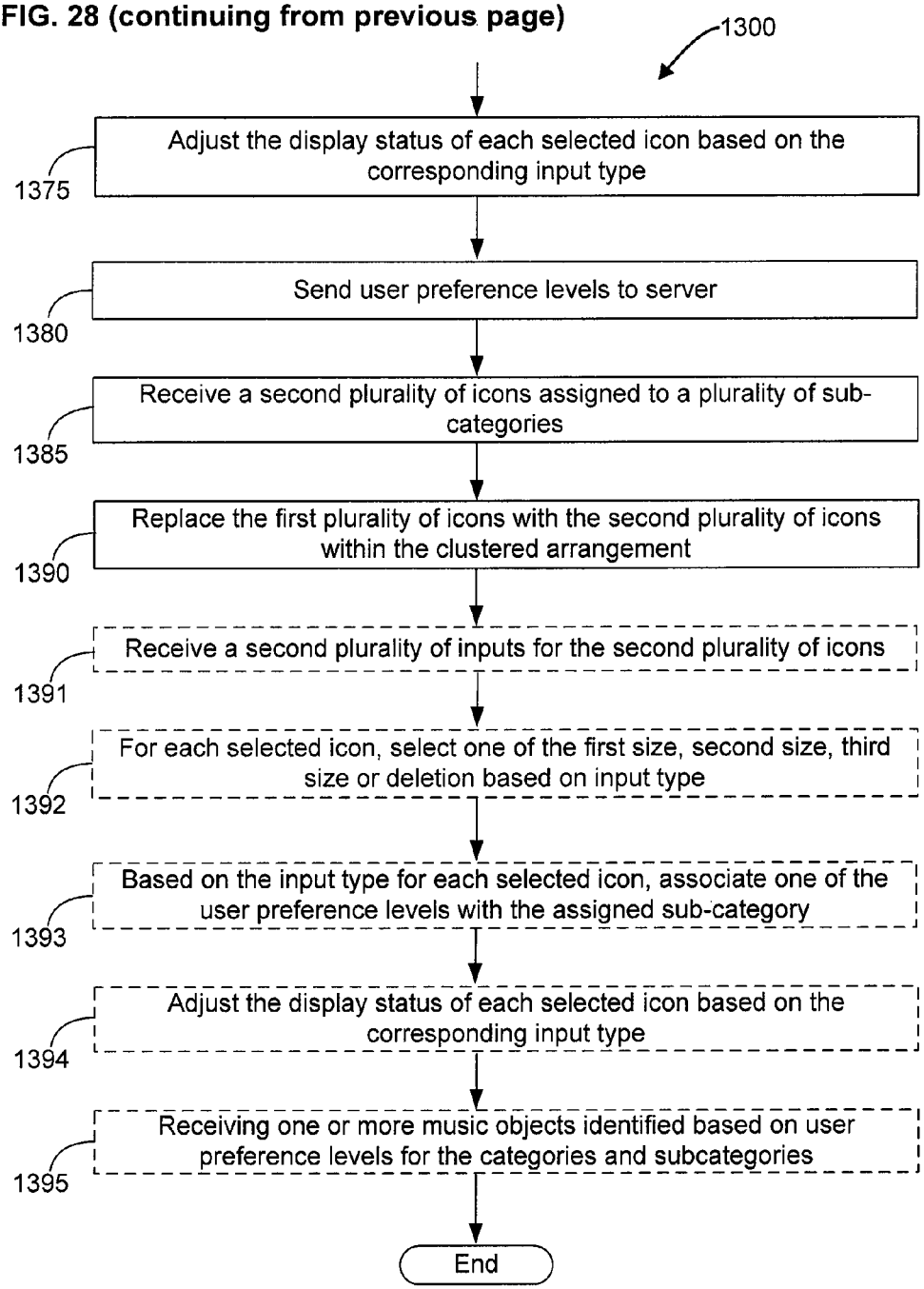

Continue to next page

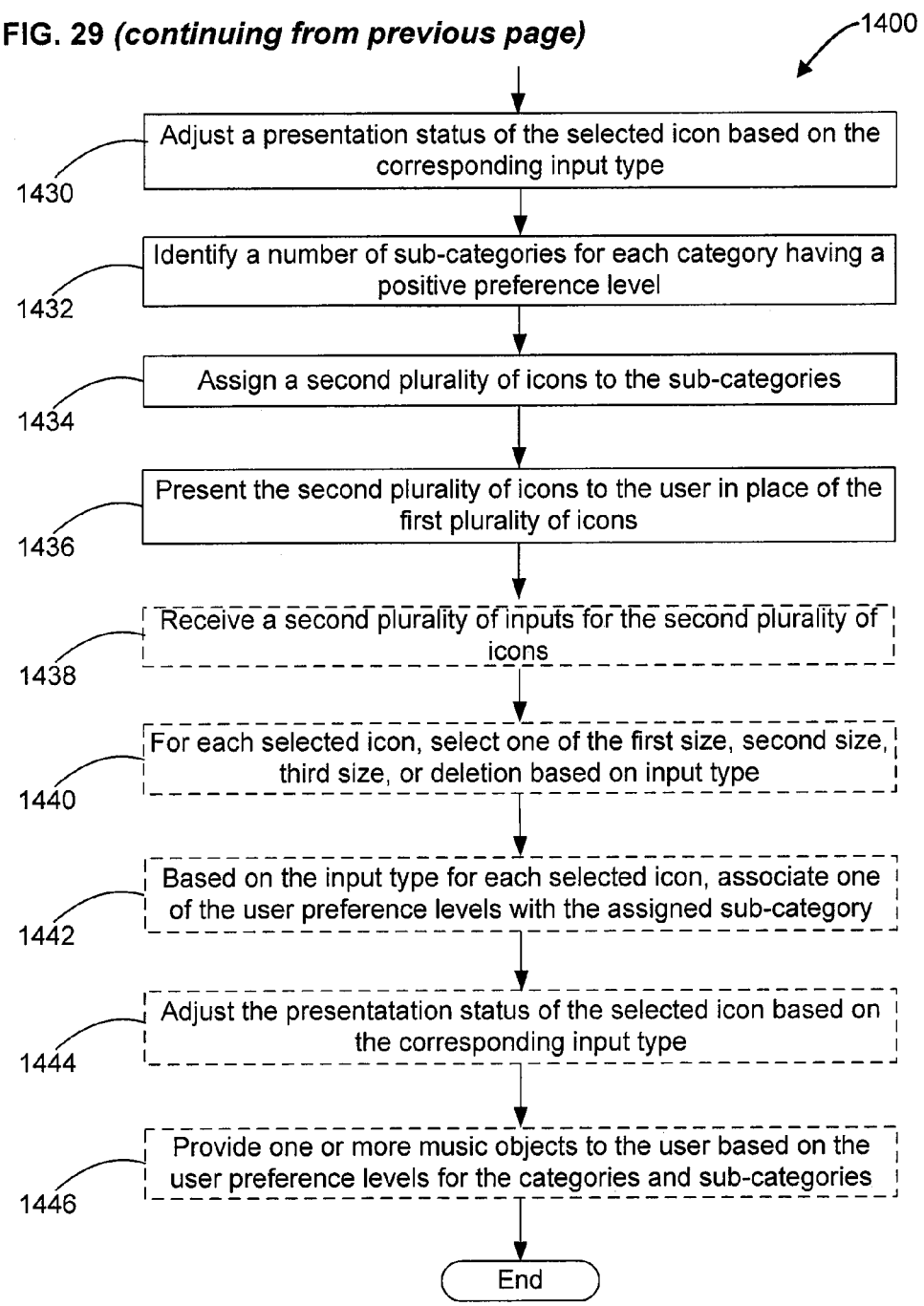

SYSTEMS AND METHODS FOR DETERMINING USER PREFERENCES USING A GRAPHICAL USER INTERFACE

FIELD

This application generally relates to managing personal preferences of a user. In particular, the application relates to platforms and techniques for determining personal preferences of a user using a graphical user interface.

BACKGROUND

Music services are gaining in popularity as more consumers seek immediate access to comprehensive music libraries. For example, instead of purchasing individual copies of songs or albums (e.g., CDs), consumers can register with various music services to access music offered by the music services. Particularly, various music services and platforms enable users to download or stream specific songs, albums, or playlists to desktop applications or mobile devices. One benefit advertised by many music services is the ability to discover new music and/or music that could be of potential interest to the users. However, there are deficiencies in existing music services and platforms.

In particular, many existing music services utilize a user's listening history or song library to compile suggestions for new or potentially interesting music, including songs, albums, or playlists. However, a user that is new to the music service may not have a history or library from which to build suggestions. As a result, the music suggestions may not be very effective or meaningful until the user creates a substantial listening history or music library with the music service. The longer it takes for the music service to reach the requisite level of effectiveness, the more likely a user will become frustrated and discontinue use of the music service.

Accordingly, with the advent and popularity of music services offering users the ability to expand their access to music libraries, there is an opportunity for implementing systems and methods for quickly and accurately determining the personal preferences of a user, particularly during an initial use of a music service.

SUMMARY OF THE INVENTION

The application is defined by the appended claims. This description summarizes aspects of the embodiments and should not be used to limit the claims. While this description is stated in the context of music services, that is only one example implementation and other implementations are contemplated in accordance with the techniques described herein.

The application is intended to solve the above-noted business and technical problems by providing systems and methods for determining personal preferences of a user using a graphical user interface during an initial use of a music service or other software application. For example, according to one aspect, a method of compiling personal preferences of a user using an electronic device is provided. The electronic device includes a display, a user interface, and a processor communicatively coupled to the display and the user interface. The method comprises simultaneously displaying, on the display, a plurality of icons in a clustered arrangement, each of the plurality of icons being assigned to a respective one of a plurality of values. The method further comprises receiving, via the user interface, a first input in association with a first icon of the plurality of icons, the first input indicating a preference for the value assigned to the first icon. The method also comprises adjusting, on the display, a size of the first icon in response to the first input, and redistributing, within the clustered arrangement, the remaining icons of the plurality of icons to accommodate the size adjustment of the first icon. Further, the method comprises receiving, via the user interface, a second input in association with a second icon of the plurality of icons, the second input indicating a dislike for the value assigned to the second icon. The method also comprises deleting, from the clustered arrangement, the second icon in response to the second input, and redistributing, within the clustered arrangement, the remaining icons of the plurality of icons to fill a space emptied by the deletion of the second icon.

As another example, according to another aspect, a method of determining personal preferences of a user using an electronic device in communication with a server is provided. The electronic device includes a display, a user interface, and a processor communicatively coupled to the display and the user interface. The method comprises receiving, from the server, a first plurality of icons assigned to a respective one of a plurality of categories, and simultaneously displaying, on the display, the first plurality of icons in a clustered arrangement. The method further comprises receiving a plurality of inputs via the user interface, each input corresponding to a selected one of the first plurality of icons and including at least one of a plurality of input types. The method also comprises in response to each input, adjusting, on the display, a display status of the selected icon based on the corresponding input type, the display status of each icon indicating a user preference level for the category assigned to the icon, and sending the user preference levels for the plurality of categories to the server. In addition, the method comprises receiving, from the server, a second plurality of icons assigned to a respective one of a number of sub-categories, each sub-category corresponding to at least one of the plurality of categories, and the number of sub-categories for each category depending on the user preference level for the category. The method further comprises replacing the first plurality of icons with the second plurality of icons within the clustered arrangement.

BRIEF DESCRIPTION OF THE DRAWINGS

For a better understanding of the invention, reference may be had to embodiments shown in the following drawings in which:

FIGS. 2-18 illustrate exemplary interfaces associated with determining personal preferences using a music service application, in accordance with embodiments.

FIG. 27 is a flow diagram depicting techniques for determining personal preferences of a user, in accordance with embodiments.

FIG. 28 is a flow diagram depicting techniques for determining personal preferences of a user, in accordance with embodiments.

DETAILED DESCRIPTION OF PREFERRED EMBODIMENTS

Figure 1:
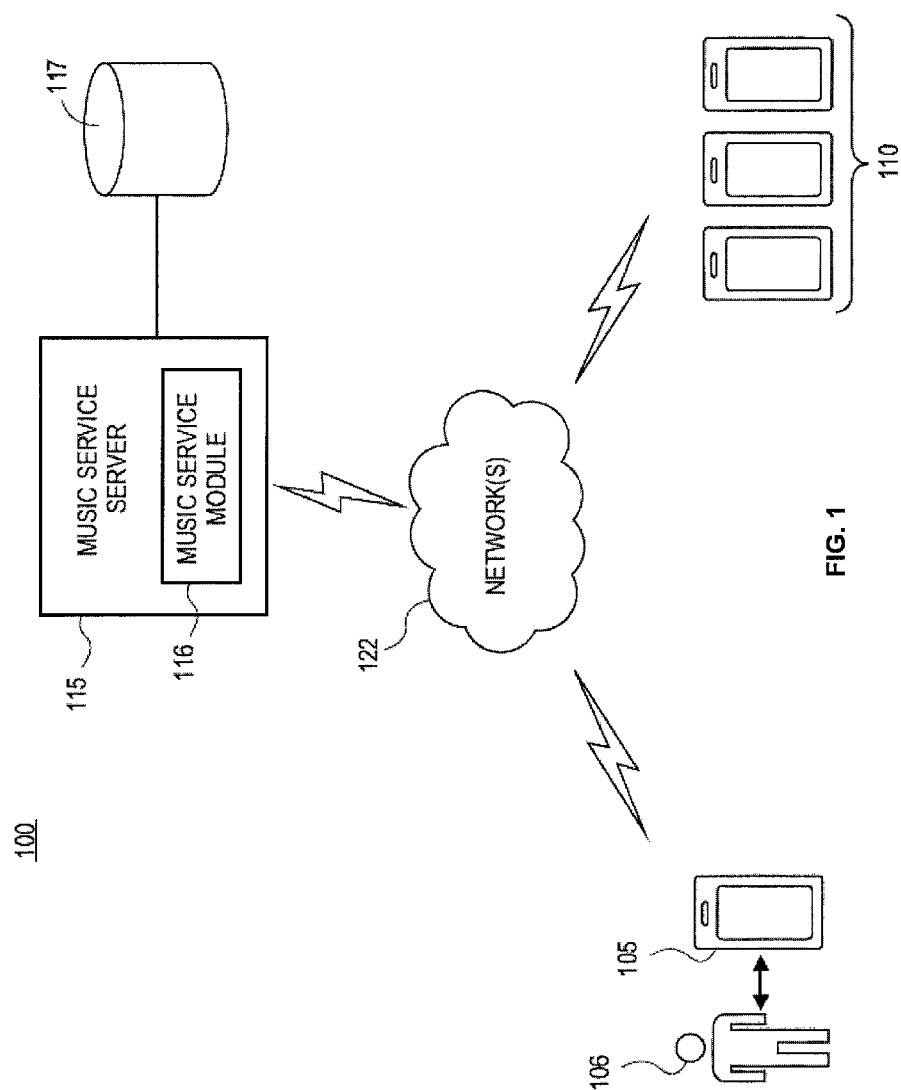
FIG. 1 is a block diagram illustrating an exemplary environment for implementing a music service, and/or portions thereof, in accordance with embodiments.

While the invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

In accordance with one or more principles of the invention, systems and methods are provided for determining personal preferences of a user during an initial use of a music service or other software application. The user may be a new user of the music service and therefore, the music service may not have historical or affiliation information or other data from which to build a profile for the user. According to embodiments, an electronic device in combination with a music service server can implement the systems and methods that present a graphical user interface for facilitating the creation of a user profile for a new user of the music service. For example, the graphical user interface facilitates the creation of the new user profile by presenting a plurality of options and requesting user feedback for the options.

In embodiments, the graphical user interface can present the options in a "game-like" environment that effectively engages the user throughout the profile-building process, and enables the user to provide more accurate feedback for each of the options. For example, the graphical user interface may present the options as icons that can be expanded, shrunk, or deleted through user interactions with (or feedback to) the graphical user interface. The size selected by the user for each icon may correlate to the user's preference for the associated option. For example, large-sized icons may indicate a positive or strong preference for the associated option and deleted icons may indicate a negative preference or disliking for the associated option. Further, the relative sizes of the icons may indicate the user's relative preferences for different options. For example, equal-sized icons may indicate a correspondingly equal preference for the associated options. In addition, the server may provide multiple tiers of options in order to narrow down or hone in on the user's taste. For example, the options presenting in each successive tier may be selected based on the preferences indicated at the previous pier. Using this multi-tiered approach for obtaining the user's preferences, and/or relative preferences, for options presented on the graphical user interface, the music service server can build a profile for the new user.

As used herein, a "music service" can be understood to be any service, platform, application, or the like that enables a set of users to access and manage media data such as music objects, among other functionalities. Further, as used herein, a "playlist" can be understood to be a listing, indication, or aggregation of one or more songs, tracks, albums, and/or other media data files or objects that are accessible to and manageable by one or more users, and from which the one or more users can select one or more songs for playback. In some cases, the media data files can be accessible locally to the device from which the user is accessing the playlist. In other cases, the media data files can be accessible via streaming from a remote server or from other devices connected to the device via a network. According to present embodiments, the music service enables users to share music with each other. In some embodiments, the set of users can register with the music service.

It should be understood that any music object sharing, identifying, determining, locating, retrieving, providing or the like can be facilitated by an electronic device singularly, or by the electronic device in communication with a server, such as a music service server. For example, the electronic device (e.g., smartphone, tablet computer, notebook computer, etc.) can request a server to locate one or more songs. Further, the server can provide any located songs to the electronic device for playback by a user. Further, both the electronic device and the server can execute a music service or similar music service module or application to implement the functionalities as discussed herein.

FIG. 1 depicts an environment 100 comprising components and entities of the embodiments as discussed herein. It should be appreciated that the environment 100 is merely exemplary and can comprise fewer or more components and entities, as well as other various combinations of components and entities.

As shown in FIG. 1, the environment 100 comprises a device 105 configured to communicate with a music service server 115. In embodiments, it should be understood that the device 105 can be any type of device such as, for example, a smart phone, a notebook or desktop computer, a tablet device, a personal data assistant (PDA), or the like, comprising any type of hardware or software components, or combinations thereof. The device 105 can execute a music service application 107 configured to facilitate the functionalities as discussed herein. As shown in FIG. 1, a user 106 can interface with the device 105 and/or the music service application 107 thereof to manage various functionalities associated with the components of the environment 100. The music service server 115 can comprise a combination of hardware or software components (such as a music service module 116), or combinations thereof, configured to support the facilitation of a music service, as well as the techniques for determining personal preferences as described herein. In some embodiments, the user 106 of the device 105 can register for an account or a registration with an associated music service and the music service server 115 and components thereof can provide music data or objects to the device 105 in accordance with a subscription of the user 106. For example, in some cases, the user 106 can select to download songs, tracks, and/or other music objects from the music service server 115 to the device 105. In other cases, the music service server 115 can stream songs, tracks, playlist files including songs, and/or other music objects to the device 105 for access and consumption by the user 106.

In embodiments as shown, the music service server 115 can couple to storage 117 that can be configured to store data associated with the music service server 115. For example, the storage 117 can store any associated music data as well as data related to subscriptions and other account information for users of the music service server 115. The device 105 can connect to the music service server 115 via a network 122 such as, for example, a wide area network (WAN), a local area network (LAN), or other networks. The network 122 can facilitate any type of wireless data communication via any wireless communication standard or technology (e.g., GSM, CDMA, TDMA, WCDMA, EDGE, OFDM, GPRS, EV-DO, WiMAX, WiFi, Bluetooth, UWB, and others). More particularly, the device 105 can send data to and receive data from the music service server 115 via the network 122. For example, the music service server 115 can receive music data requests from the device 105 and can transmit or stream music data to the device 105 according to the requests. In another example, the music service server 115 can receive indications of the user's musical preferences from the device 105 and can transmit or stream music data to the device 105 in accordance with the musical preferences.

As shown in FIG. 1, the environment 100 can further comprise a set of additional devices 110 that can also be configured to connect to the music service server 115 via the network 122. Each of the set of additional devices 110 can be associated with a set of additional users of the music service implemented by the music service server 115. More particularly, each of the set of additional users can have an associated account with the music service or can otherwise register with the music service. In embodiments, the device 105 can be configured to connect to and/or exchange data with the set of additional devices 110 via the network 122. Any of the additional devices 110 can send music data to the device 105 and/or to any of the remaining additional devices 110 via the network 122.

According to implementations, the music service server 115, the device 105, and the set of additional devices 110, and components thereof, can facilitate the management of music subscriptions of the users of the respective devices 105, 110. More particularly, the music service server 115 (and the music service module 116 thereof), the device 105 (and the music service application 107 thereof), and/or the set of additional devices 110 can enable the respective users to share music objects with each other. It should be appreciated that the music objects, as described herein, can be any type of music data and information such as, but not limited to, one or more songs, one or more albums, a group of songs by a particular artist, one or more playlists, one or more music videos, various music artwork, and/or other types of media of data.

Users of the device 105 and/or the set of additional devices 110 can interface with respective devices 105, 110 to initiate a music service or application and manage the functionalities of the music service. The device 105 and/or the set of additional devices 110 can communicate with the music service server 115 to transmit share activity, identify music objects based on the share activity, and access the music objects. In embodiments, a user can select to play a music object, at which point the music service server 115 can retrieve the appropriate music object from the storage 117 and provide (e.g., by streaming) the music objects to the appropriate device 105, 110. In some embodiments, one or more of the music objects can be played from a local cache of the appropriate device 105, 110. In further embodiments, one or more of the music objects can be retrieved via a peer-to-peer (P2P) network among the device 105 and the set of additional devices 110.

According to embodiments, the user 106 can be "connected" to or "following" other users (such as users of the additional devices 110) via a social feature of the music service. In some cases, some of the "connections" can be mutual whereby if User A is connected to User B, then User B is connected to User A. In other cases, some of the connections can be one-directional whereby if User A is following User B, then User B is not necessarily following User A. The social feature can enable users to share music objects with additional users of the music service, such as a particular user sharing a music object with one or more connections or followers. In embodiments, one or more users can belong to a certain group or other type of aggregation of users. It should be appreciated that other types of connections, followings, and groups among users are envisioned. According to aspects, the social feature of the music service enables users to effectively and efficiently share music and other media with other users and groups of users.

According to embodiments, each user of the music service can have an associated music profile that can include any data related to the musical tastes, preferences, listening history, interactions or social network connections with artists and/or other users, listening data or trends, songs or artists that share similarities with other songs or artists that the user enjoys, has listened to, and/or is otherwise associated with the user, and/or any other data that can indicate the songs, bands, artists, genres, and/or musical eras that a user tends to enjoy or not enjoy. In embodiments, the music profile of the user can be based on other users, entities, or music or playlist curators that the user is connected to, "follows," subscribes to, or is otherwise associated with in the music service.

As mentioned above, new users of the music service may not have a music profile when they initially sign-up or register with the music service. For example, the music service will not have a new user's listening data, trends, and/or history, or the new user's list of social interactions and network connections with artists and/or other users, all of which may be used to build a music profile, as discussed above. In embodiments, the music service includes one or more aspects for facilitating the creation of a music profile for a new user. For example, the music service application may include a graphical user interface for building a new music profile.

FIGS. 2-18 depict exemplary interfaces associated with the execution, facilitation, and implementation of an aspect of the music service designed to build a music profile for a new user of the music service according to embodiments. More particularly, FIGS. 2-18 depict screenshots of exemplary graphical user interfaces associated with a profile generation aspect of the music service application executing on an electronic device. The exemplary interfaces can be displayed on displays of devices of the users of the music service, such as the device 105 and the additional devices 110. The devices can be configured to execute the music service application, and the interfaces of the music service application enable the users to provide input associated with various functionalities. The data associated with the exemplary interfaces can be transmitted to, received from, and/or synchronized with a server, such as the music service server 115.

Figure 2:
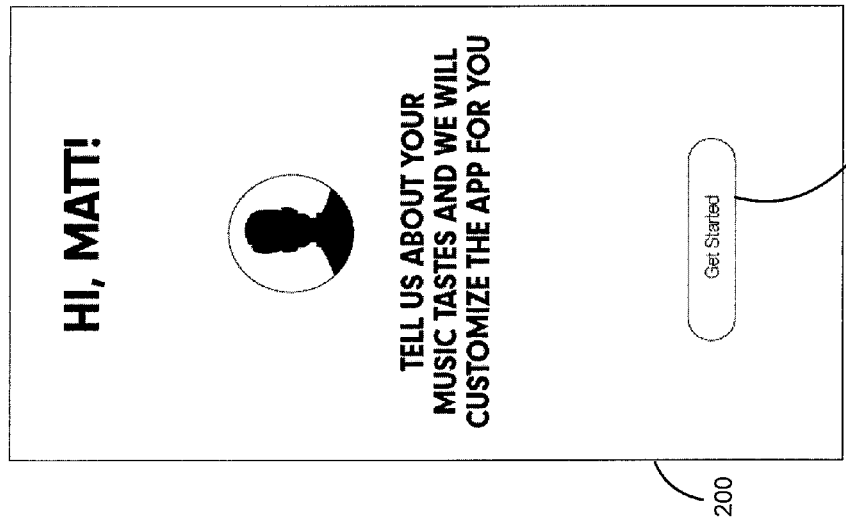

The users can interface with the music service application via a user interface of the devices, such as a touchscreen 204, as illustrated in FIG. 2. The exemplary interfaces can be displayed on the touchscreen 204, which includes contact-sensing technology configured to sense or detect user contact on the touchscreen 204 and to send one or more signals indicating detection of a contact-based input to a processor (e.g., processor 1014 in FIG. 10) executing the music service application. It should be appreciated that the interfaces of FIGS. 2-18 are merely exemplary and can comprise other various details, arrangements, and/or selectable options.

In embodiments, FIGS. 2-18 can represent segments of a user interface flow associated with a profile generation aspect of the music service application. For example, FIG. 2 depicts a screenshot of an exemplary profile generation interface 200 that may appear after logging into the music service screen application for the first time, e.g., as a "splash page." The interface 200 may welcome new users to the service and explain the initial set-up or "onboarding" process. The user may select (e.g., touch) a "Get Started" icon 201 to begin the onboarding process, which is shown, for example, in FIGS. 3-18. In embodiments, the exemplary interfaces shown in FIGS. 3-9 may represent a first segment of the profile generation process configured to determine the personal preferences of the user with respect to a first plurality of values. FIGS. 10-18 may represent a second segment of the process configured to determine the personal preferences of the user with respect to a second plurality of values that are selected based on the user's preferences for the first plurality of values. For example, in embodiments, the first segment may involve determining which music genres the user prefers, and the second segment may involve determining, for each selected music genre, the music artists that the user prefers. In this manner, the profile generation process is able to capture both broad and narrow user preference information and synthesize the user's selections to create at least an initial user profile for the music service application.

Figure 3:
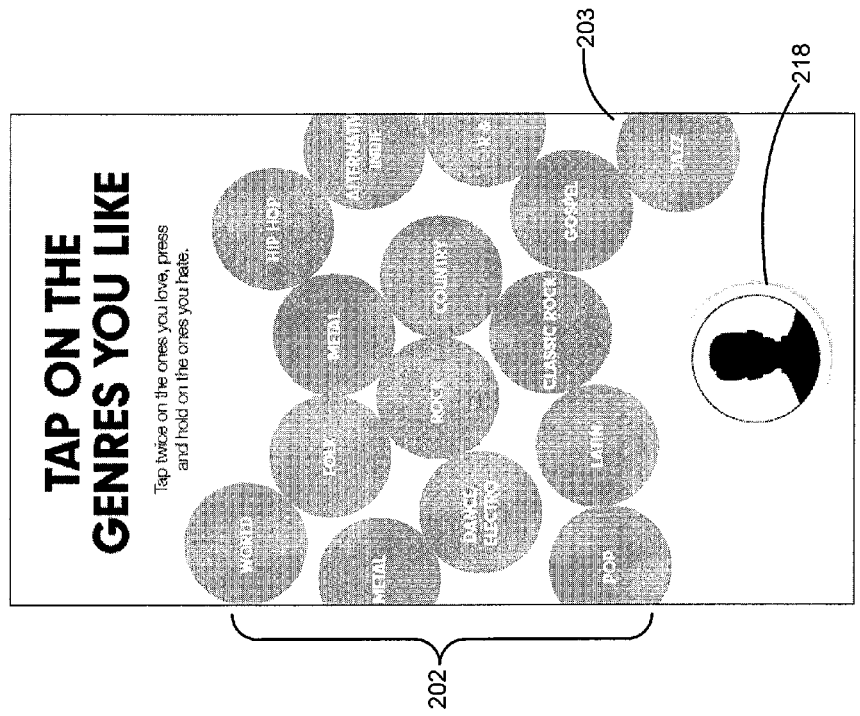
Figure 23:
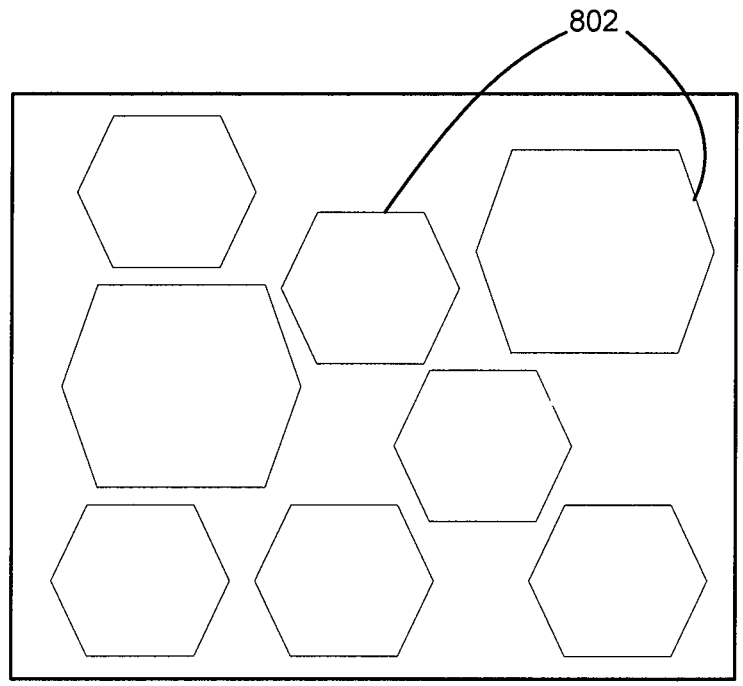
FIG. 23 illustrates another exemplary interface associated with determining personal preferences using a music service application, in accordance with some embodiments.
Figure 24:
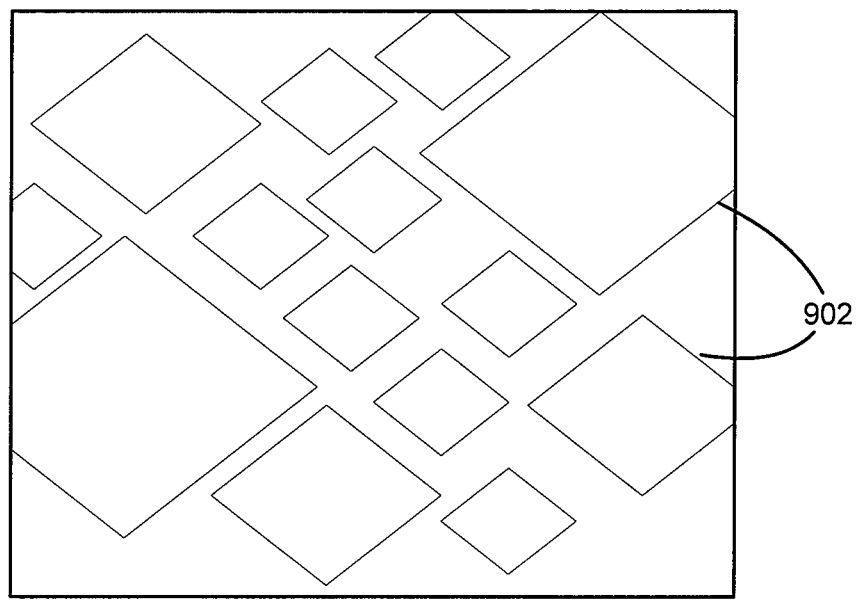
FIG. 24 illustrates yet another exemplary interface associated with determining personal preferences using a music service application, in accordance with embodiments.

Referring to FIG. 3, depicted is a screenshot of an exemplary profile generation interface 203 associated with the music service application. In embodiments, the interface 203 may appear upon user selection of the "Get Started" icon 201, at which point the images 202 (or "bubbles") may float in from the sides of the display and fill the interface 203. As shown in FIG. 3, the profile generation interface 203 includes a plurality of images 202 arranged in a cluster or closely packed group. The images 202 may include icons, symbols, logos, pictures, or any other graphical figures. In the illustrated embodiment, the images 202 are identical two-dimensional circles having a uniform size. It should be appreciated that FIG. 3 is merely exemplary and the images 202 can have any size (such as, e.g., the larger-sized icons shown in FIGS. 19 and 20), can have any shape, geometric or otherwise, (such as, e.g., a square, a hexagon (see icons 802 in FIG. 23), an octagon, a heart, a star, a rectangle, a diamond (see icons 902 in FIG. 24), a triangle, an oval, a kidney-shape, etc.), can be two-dimensional or three-dimensional, and/or can comprise a combination of different shapes (e.g., hearts and stars, triangles and squares, ovals and diamonds, etc.).

Figure 19:
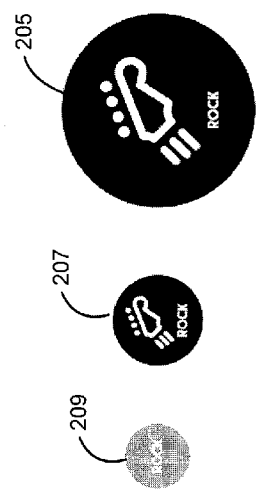
FIGS. 19 and 20 illustrate exemplary icons in various stages of growth in accordance with embodiments.
Figure 20:
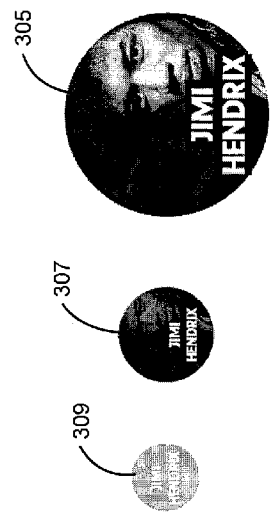

In embodiments, the plurality of images 202 (also referred to herein as icons 202) can be associated with a plurality of values and can include, or otherwise be displayed in association with, one or more descriptive words and/or graphics corresponding to the plurality of values, as shown by the exemplary icons 205, 207, and 209 in FIG. 19 and exemplary icons 305, 307, and 309 in FIG. 20. The plurality of values may be any type of parameter related to the creation of a new user profile or otherwise determining user preferences. For example, the plurality of values may include parameters related to music genres or categories, musical eras, bands, artists, song titles, albums, playlists, radio stations, other users of the music service, or any other topic that can indicate the personal preferences of a user. In the illustrated embodiment, the plurality of values relate to music genres, namely alternative, gospel, folk, hip-hop, pop, jazz, rock, metal, classical rock, electronic, dance, R&B, latin, world, indie, and country. In some embodiments, other music genres may be displayed in addition to, or instead of, the displayed values, such as, e.g., blues, punk, Christian, soul, bluegrass, reggae, etc. In some embodiments, the plurality of values may include music categories in addition to industry-defined music genres, such as, e.g., Billboard Top 100, Grammy-nominees, Grammy-winners, etc.

According to embodiments, the icons 302 can include text and/or graphics (e.g., logos, symbols, etc.) that represent the plurality of values associated therewith. The text and/or graphics associated with each value may be pre-determined and may be provided with the corresponding icon 202 by the music service server and/or the music service application. In FIG. 3, each icon 202 includes text naming the associated music genres. As shown in FIGS. 19 and 21, in some embodiments, one or more of the plurality of icons 202 can include symbols that graphically represent the associated music genres. As another example, FIG. 11 illustrates a plurality of icons 302 that are associated with music artists, and FIG. 20 shows that the icons 302 can include text and/or graphics that represent the associated music artist. In the illustrated embodiments, the text and/or graphics representing the values are included within the respective icons 202 or 302. In other embodiments, the text and/or graphics may appear next to, below, above, around, or in any other position relative to the icons.

In embodiments, a user may select or interact with one or more of the icons 202 by tapping or touching the icon 202 with a finger, for example, if the user interface is a touchscreen; by clicking on the icon 202 with a pointer, for example, if the user interface is a mouse; or by using any other input means. The interface 203 and/or the music service application may be configured to recognize certain gestures or inputs and to associate a predetermined result with each gesture or input. The gestures and inputs may include, for example, a single tap or touch, a single click, a double tap or touch, a double click, a long tap or touch (also referred to herein as "a long hold"), a long click, a right click, a left click, a multi-touch pinch, a multi-touch stretch, a multi-touch swipe, a single-touch swipe, etc. The predetermined results may include, for example, a size expansion or increase of the selected icon, a size reduction or decrease of the selected icon, or a deletion or removal of the selected icon.

In some embodiments, the interface 203 enables the user to grow or shrink the size of the icons 202 in order to match or indicate the user's taste or preference for the values associated with icons 202. For example, the largest-sized icons (such as, e.g., icon 205 in FIG. 19) may indicate a strong preference or a "love" for the associated value, medium-sized icons (such as, e.g., icon 207 in FIG. 19) may indicate a positive preference or a "like" for the associated value, and the smallest-sized icons (such as, e.g., icon 209 in FIG. 19) may indicate an ambivalence or no preference for the associated value. Further, icons of equal or similar size (such as, e.g., icons 228 and 230 in FIG. 8) may indicate equal or similar preferences for the associated values. And icons 202 that are deleted or popped by the user may indicate a dislike or negative preference for the associated values (such as, e.g. icon 208 in FIG. 5). In this regard, the largest icons may be assigned a magnitude of two (2), the medium icons may be assigned a magnitude of one (1), the smallest icons may be assigned a magnitude of zero (0), and the deleted icons may be assigned a magnitude of negative one (−1). (More details regarding the growing, shrinking, and popping of icons will be discussed below.) In some embodiments, the interface 203 may use other forms of animations to differentiate a selected icon and thereby, represent the user's preferences for the values associated with icons 202. For example, in response to user selection of a given icon, the icon may change from one shape to another (e.g., turn from a circle into a heart), be displayed with another graphic (e.g., a heart, star, "X", or any other symbol overlaying the icon), and/or begin twinkling, flashing, bouncing, pulsing, or any other type of action.

Figure 8:
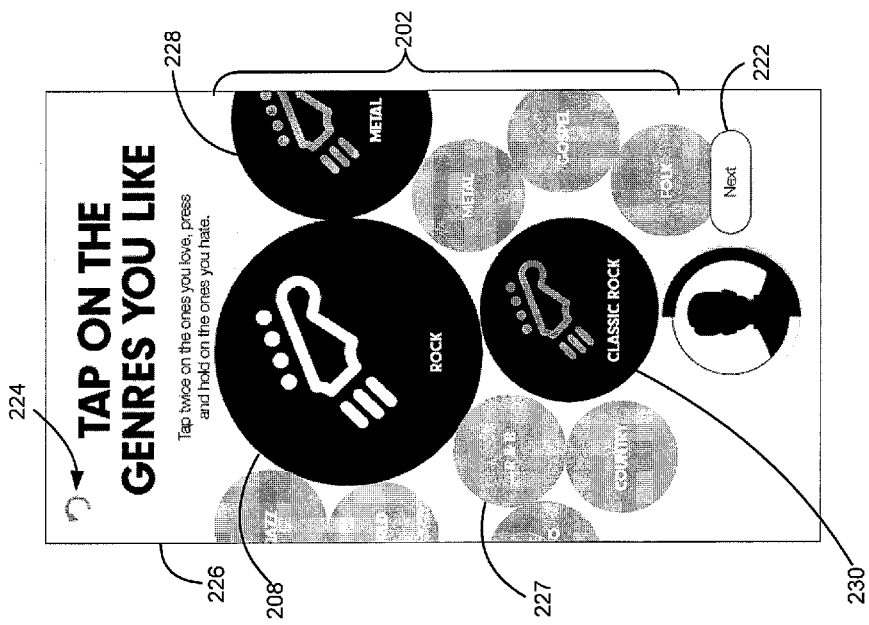
Figure 21B:
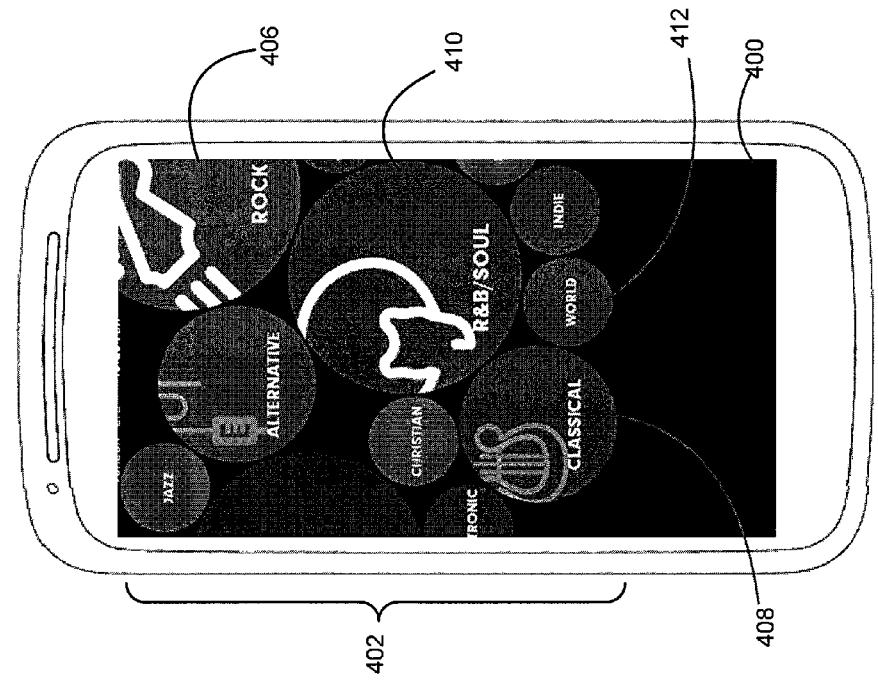
FIGS. 21A and 21B illustrate portions of an exemplary interface associated with determining personal preferences using a music service application, in accordance with embodiments.
Figure 21A:
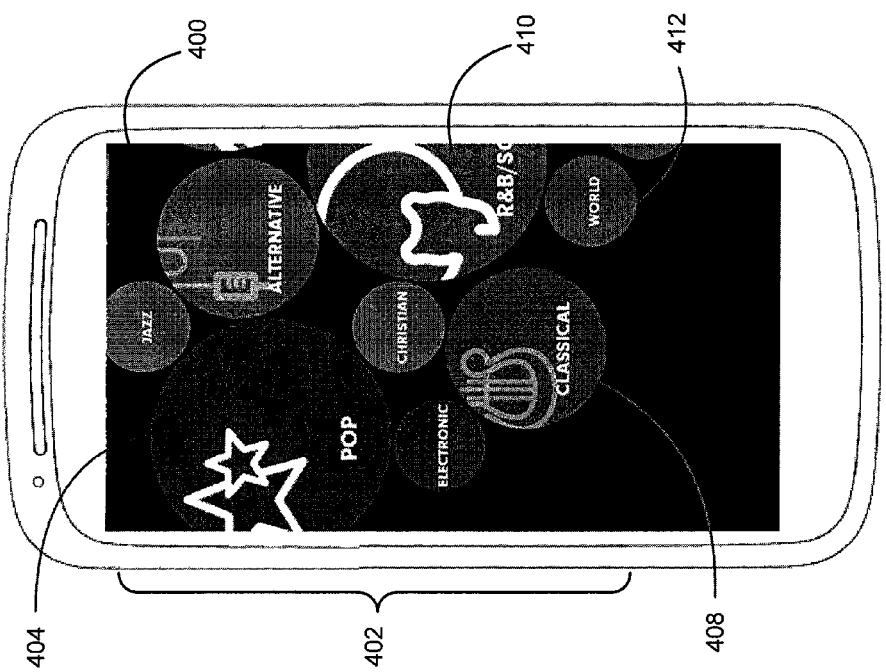

In embodiments, only the icons 202 having a specific size may include both graphics and text to represent the associated value. And icons 202 that are below the specific size may include only text to represent the associated value. For example, in FIG. 3, each of the icons 202 has a uniform first size and includes only the text of the associated value. In FIG. 8, the icons 202 have a plurality of sizes, including a first size (e.g., icon 227), as well as a second size (e.g., icons 228, 230) larger than the first size, and a third size larger than the second size. As illustrated, the icons 208, 228, 230 having the second size or larger include both the text and the graphics of the associated value. For example in FIG. 8, icon 227 has the first size and includes only the text "R&B." As another example, icon 230 has the second size and includes both the text "classic rock" and a graphic associated with the class rock music genre. As yet another example, icon 208 has the third size and also includes both the text "rock" and a graphic associated with the rock music genre. While FIG. 8 shows similar graphics for each of the icons 208, 228, and 230, it will be appreciated that each icon 202 can have a unique graphic, for example, as shown in FIGS. 21A & 21B. It will also be appreciated that the graphics shown in association with the icons 202, as well as the icons 402 in FIGS. 21A and 21B, are merely exemplary and that the icons may comprise other symbols, logos, or graphics in addition to, or instead of, the illustrated graphics.

In embodiments, the icons 202 can be animated in order to provide a video game feeling to the profile generation interface 203. For example, as a given icon 202 grows or expands, the icon 202 may push the other icons 202 away to make room for the size expansion (e.g., as shown in FIGS. 22B-22D). Similarly, as a given icon 202 shrinks or is reduced, the other icons 202 may move towards the shrunken icon 202, to fill the space once occupied by the larger icon 202 (e.g., as shown in FIG. 22F). Likewise, when a given icon 202 pops or is deleted, the other icons 202 may tumble into, or drift towards, the space left empty by the deleted icon 202 (e.g., as shown in FIG. 22E). In embodiments, the icons 202 can also be dragged around the interface 203 to reposition a selected icon 202 anywhere on the interface 203.

As another example of animation, the icons 202 may be continuously moving, bouncing, floating, drifting, or otherwise shifting positions across the profile generation interface 203, having a level of viscosity independent of any manipulation by the user. In some embodiments, the icons 202 may slowly drift through the interface 203, for example, like bubbles floating through the air. The icons 202 may bump into one another and/or one or more boundaries of the interface 201, bounce off, and drift away in a new direction, until bumping into yet another icon 202 and/or boundary, and so on. In such embodiments, the icons 202 may resemble, or move like, bubbles or balloons floating within a confined space and in some cases, may tend to stick together and move in unison, like a cluster of bubbles. For example, the slight change in position of adjacent icons 408 and 410 between FIG. 21A and FIG. 21B may be caused by the icons 402 floating in this manner. Specifically, in FIG. 21A, the icons 408 and 410 are separated by a small gap, while in FIG. 21B, the icons 408 and 410 are nearly touching.

Figure 7:
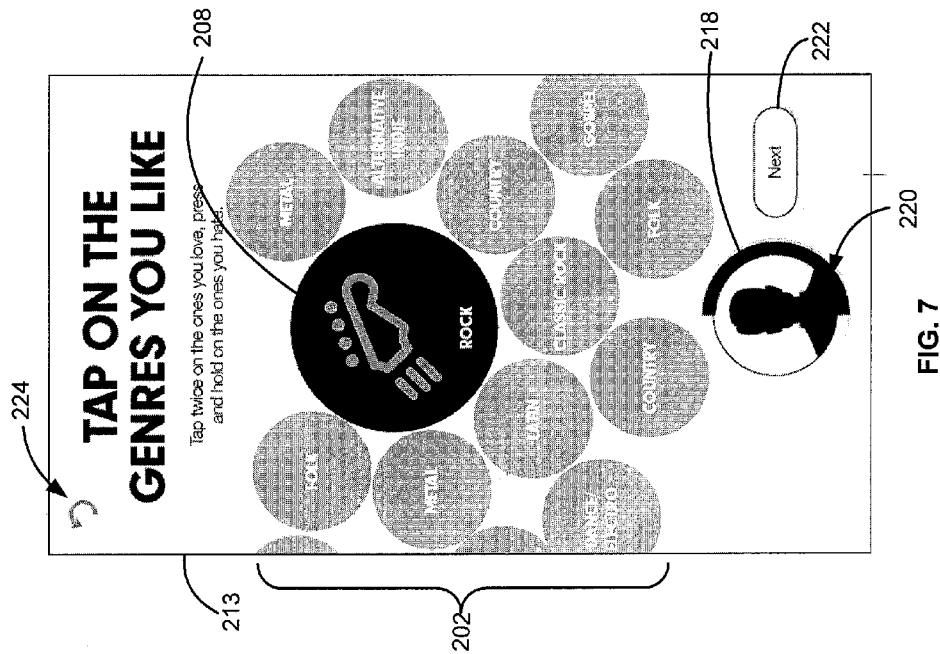

As shown in FIG. 3, the profile generation interface 203 can include a profile progress indicator 218 for displaying the user's progress through the segments of the profile generation process. In the illustrated embodiment, the progress indicator 218 is circular in shape. As will be appreciated, the indicator 218 can have any other shape and/or size, including a square, hexagon, oval, etc. During an initial stage of the profile generation process (for example, before the user makes any selections of the icons 202), the progress indicator 218 may appear empty or blank, as shown in FIG. 3. Once the user selects at least one of the icons 202, a progress bar 220 may appear within the progress indicator 218 and fill in at least part of the indicator 218, as shown in FIG. 7. In some embodiments, the progress bar 220 may appear only upon indicating a positive preference for the icon 202, as discussed herein. In other embodiments, the progress bar 220 may appear regardless of the type of preference indicated.

A size of the progress bar 220 may depend on the number of icons 202 selected, the number of selections needed to complete a current segment of the profile generation process, and/or the current segment of the profile generation process. In embodiments, half of the progress indicator 218 may be dedicated to showing progress within the music genre segment, and the other half may be dedicated to showing progress within the music artist segment of the profile generation process. In some embodiments, selection of just one music genre icon 202 satisfies the genre selection segment, and therefore, as shown in FIG. 7, the progress bar 220 may fill half of the progress indicator 218 after selection of just one icon 202. In some embodiments, selection of three music artist icons 302 satisfies the artist selection segment, and therefore, as shown in FIGS. 12-14, the progress bar 220 may gradually advance from the halfway mark shown in FIG. 11 as the user selects one artist (FIG. 12), two artists (FIG. 13), and then three artists (FIG. 14). In some embodiments, the progress bar 220 may also advance in response to popping one or more icons 302. In one embodiment, the progress bar 220 advancement associated with popping the icons 302 may be less than the progress bar 220 advancement associated with growing the icons 302.

Referring to FIGS. 4 and 5, depicted are screenshots of exemplary profile generation interfaces 206 and 210, respectively, associated with the music service application. The interfaces 206 and 210 include the plurality of icons 202 shown in FIG. 3, including a "rock" icon 208. In FIG. 4, the interface 206 has detected a deletion input 211 in association with the rock icon 208. In the illustrated embodiment, the gesture 211 is a tap and hold gesture, or a long hold, that lasts a predetermined amount of time, such as, e.g., three seconds. Other types of gestures may be used to indicate a deletion input, so long as the gestures for deletion and expansion are different. Upon identifying the deletion input 211, the interface 206 may display instructional text and a countdown to indicate how much longer the user needs to maintain the hold, such as, e.g., "Keep Holding to Remove 3," "Keep Holding to Remove 2," and "Keep Holding to Remove 1." Once the countdown ends, the rock icon 202 may disappear or pop and the original instructional text from FIG. 3 (e.g., "Tap on the genres you like") may re-appear, as shown in the interface 210 of FIG. 5.

Figure 6:
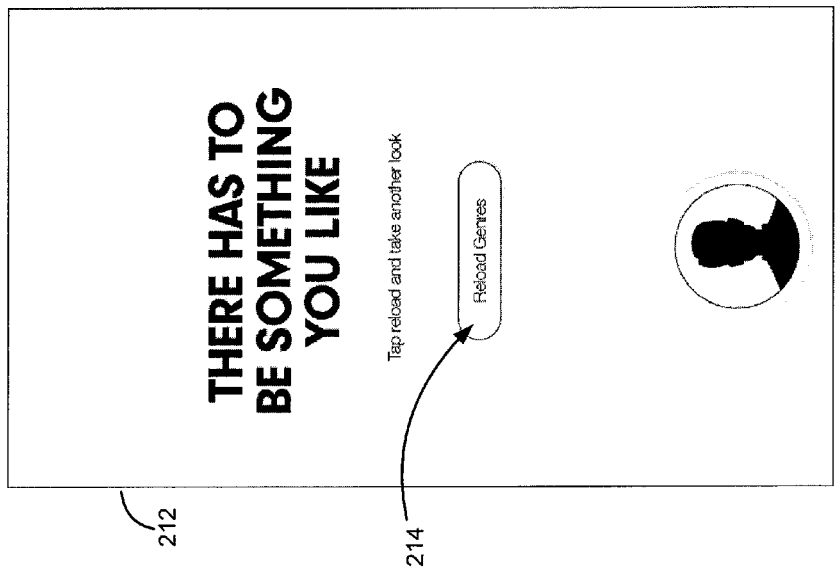

Referring to FIG. 6, depicted is a screenshot of an exemplary profile generation interface 212 associated with the music service application. The interface 212 may appear if the user has deleted all of the icons 202, for example, because the user does not like any of the music genre options presented by the icons 202. As illustrated, the interface 212 includes a "reload genres" option 214 for encouraging the user to retry the music genre selection segment of the profile generation process.

Referring to FIG. 7, depicted is a screenshot of an exemplary profile generation interface 213 associated with the music service application. The interface 213 may appear once the user has entered an expansion input with respect to the rock icon 208. As illustrated, in response to the expansion input, the rock icon 208 becomes larger than the remaining icons 202. The exact size increase caused by each expansion input can vary, as will be appreciated. In one embodiment, a first expansion input can cause a fifty percent increase in size and a second expansion input can cause a one hundred percent increase in size, as shown in FIGS. 19 and 20.

Upon selecting at least one music genre icon 202, a reset option 224 may appear, as shown in FIG. 7. The reset option 224 may allow the user to undo any icon selections made and start the music genre segment from scratch. Further, upon selecting a minimum number of icons 202 for completing the music genre segment, a "next" option 222 may appear for moving to the next segment (e.g., the music artist segment). In the illustrated embodiment, the next option 222 appears in the interface 213 because the minimum number of icons 202 is one. However, the user is free to enter more selections before moving to the next segment. In that regard, FIG. 8 depicts a screenshot of an exemplary profile generation interface 226 in which the user has entered a second expansion input with respect to the rock icon 208 and first expansion inputs with respect to the metal icon 228 and the classic rock icon 230. As a result, the rock icon 208 is shown in the largest size, the metal icon 228 and the classic rock icon 230 are shown in the medium size, and the unselected icons 220 are shown in the smallest size.

Figure 9:
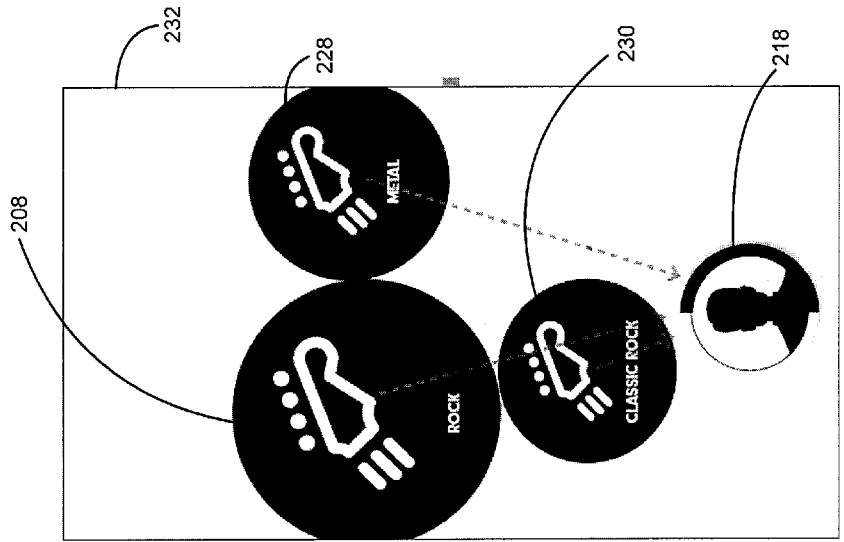

FIG. 9 depicts a screenshot of an exemplary profile generation interface 232 that may appear once the user presses the next option 222 (e.g., after the user has completed the music genre segment of the profile generation process). As illustrated, selection of the next option 222 may initiate an animation feature in which the unselected or remaining icons disappear or fade away and the selected icons 208, 228, and 230 fly into the progress indicator 218, thereby indicating the end of the music genre segment. In embodiments, the music artist segment may automatically start after completion of the animation feature shown in FIG. 9.

FIG. 10 depicts a screenshot of an exemplary profile generation interface 300 associated with the music service application. The interface 300 may be an initial screen of the music artist segment of the profile generation process. Soon after its appearance, the interface 300 may fill up with a plurality of icons 302 that are respectively associated with a plurality of values related to music artists, as shown in FIG. 11.

FIG. 11 depicts a profile generation interface 303 that includes a plurality of music artist icons 302 that were selected by the music service application based on the user inputs received during the music genre segment of the profile generation process. In embodiments, the music genre values may be considered categories, and the music artist values may be considered sub-categories of those categories. The makeup of the music artist values associated with the icons 302 can depend on the user preference information gathered during the music genre segment of the process. For example if, during the music genre segment, the user indicates a "like" for the icon 202 assigned to pop music (e.g., by inputting a single tap), a fair portion of the music artist icons 302 will be associated with pop music artists. If the user indicates a "love" for the pop music icon (e.g., by inputting a double-tap), a large portion of the music artist icons 302 will be associated with pop music artists. Likewise, if the user indicates a "hate" for the icon assigned to pop music (e.g., by inputting a long hold), none of the music artist icons 302 will be associated with pop music artists.

As illustrated in FIG. 11, the interface 300 includes a back option 301 that allows the user to return back to the music genre segment before making any music artist selections. For example, after seeing the music artist icons 302 displayed on the interface 303, the user may decide that the displayed artists do not reflect the user's music tastes and that his/her music genre selections need to be modified or re-done completely.

In embodiments, the icons 302 may be similar to the icons 202 in terms of animations, size expansions, deletions, size reductions, etc. For example, a single tap may increase the icon 302 from the initial size to the second size, a double tap may increase the icon 302 from the second size to the third size, a third tap may reduce the icon 302 back to the initial size, and a long hold may delete the icon. In some embodiments, the icons 302 may have additional animation features. For example, the icons 302 may exhibit an increase in "gravity" as the icons become larger, such that the larger icons slowly gravitate towards each other and into the center of the interface 303, pushing smaller icons out to the edges of the interface 303. Further, in some embodiments, the icons 302 associated with similar genres may be clustered together initially, for example, in the interface 303, for ease of identification.

In FIG. 11, the icons 303 appear in an initial, uniform size, like the icons 202 in FIG. 3, because the user has not yet entered any inputs. FIG. 12 depicts a screenshot of an exemplary profile generation interface 313 in which a first size expansion input has been received with respect to a "Jimi Hendrix" icon 308. In response to the first size expansion input, the icon 308 has been enlarged, for example, by fifty percent. FIG. 13 depicts a screenshot of an exemplary profile generation interface 326 in which a first size expansion input has been received with respect to a "Smashing Pumpkins" icon 328. As illustrated in FIG. 13, the icons 308 and 328 are now enlarged, while the remaining icons 302 are still the initial size. FIG. 14 depicts a screenshot of an exemplary profile generation interface 332 in which a first size expansion input has been received with respect to a "Nirvana" icon 330, thereby enlarging the icon 330 to match the sizes of the icons 308 and 328.

As illustrated in FIGS. 11-14, interfaces 303, 313, and 326 may include instructional text indicating how many positive music artist selections are needed to complete the music artist segment of the profile generation process (e.g., "Tap on 3 artists you like," "Tap on 2 artists you like," "Tap on 1 artist you like," and "All done"). In the illustrated embodiment, at least three positive artist selections are needed to complete the segment, but the user is free to make many more selections. In embodiments, upon entering at least one input, expansion or deletion, a reset button 324 may appear to allow the user to reset any selections made within the music artist segment, as shown in FIG. 12. Further, upon selecting a minimum number of icons needed to complete the music artist segment, a "finish" option 322 may appear to allow the user to end the profile generation process, as shown in FIG. 14. Like the animation feature shown in FIG. 9, upon selecting the finish option 322, the enlarged icons 308, 328, and 330 may fly into the progress indicator 218, thereby indicating the end of the music artist segment of the profile generation process. FIG. 16 depicts a screenshot of an exemplary profile generation interface 336 that may appear after the music artist segment is complete and prior to appearance of a home screen of the music service application. For example, the interface 336 may appear while the music service application is generating music recommendations and/or playlists that are specifically tailored to the newly completed user profile.

Figure 18:
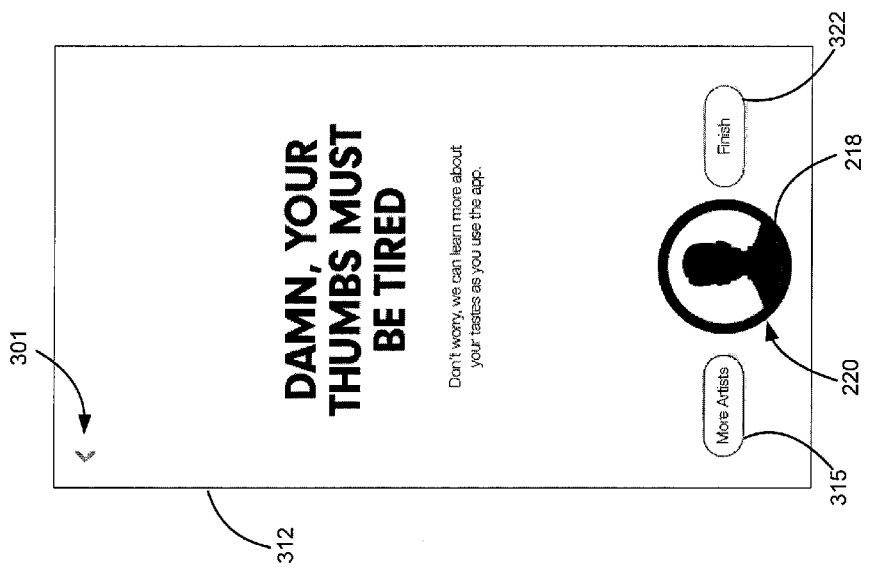

FIG. 17 depicts a screenshot of an exemplary profile generation interface 340 in which the user has selected a "more artists" option 315 that enables the user to replace all initial-sized icons 302 with a new set of music artist icons. As illustrated, upon selection of the more artists option 315, all of the icons 302 disappear or pop except for any enlarged icons, such as, the Jimi Hendrix icon 308 in FIG. 17. In some embodiments, the music artist values associated with the new icons may be selected at least partially based on any enlarged icons remaining on the screen. FIG. 18 illustrates a profile generation interface 312 that appears once the user has deleted all of the icons 302. In such a case, the user can choose to end the profile generation process by selecting the finish option 322, restart the music artist segment by selecting the more artists option 315, or return to the music genre segment by selecting the back option 301.

In one embodiment, deleted icons can been replaced with one or more new icons that were not previously displayed. According to one embodiment, the icons 202 or 302 may be part of a first group of icons, and the new icons may be part of a second group of icons different from the first group of icons. In some embodiments, the profile generation aspect of the music service application may identify a first group of sub-categories and a second group of sub-categories based on the categories preferred by the user in the music genre segment. The sub-categories may be placed into the first and second groups based on a number of factors, such as, for example, general awareness of the sub-categories, the existence of cross-categorization among preferred categories (e.g., music artists that fall into more than one preferred music genre), popularity of the sub-categories among other users of the music service who prefer the same or similar categories, etc. For example, well known sub-categories may appear in the first group, and lesser known sub-categories may appear in the second group.

Referring to FIGS. 21A and 21B, depicted are exemplary screenshots of a profile generation interface 400 associated with the music service application. The interface 400 may be similar in function to one or more of the interfaces discussed above with reference to FIGS. 2-18. In embodiments, the profile generation interface 400 can extend beyond, or be larger than, a display screen 402 of the electronic device. For example, FIGS. 21A and 21B show different partial views of the profile generation interface 400. The profile generation interface 400 may extend even further beyond FIGS. 21A and 21B, as indicated by the partial views of "pop" icon 404 in FIG. 21A and "rock" icon 406 in FIG. 21B. A user can view the entire profile generation interface 400 by scrolling laterally across a width of the display screen 402, for example, from FIG. 21A to FIG. 21B, and/or by scrolling longitudinally across a length of the display screen 402.

Referring to FIGS. 22A-22F, depicted are screenshots of an exemplary profile generation interface 700 associated with the music service application. In particular, FIGS. 22A-22F may represent a flow of graphical user interfaces associated with generating a new profile and/or determining the personal preferences of a new user. As illustrated, the interface 700 includes a plurality of icons or bubbles 702, and each of the FIGS. 22A-22F shows the bubbles 702 in a different clustered arrangement, e.g., at different phases or stages of the profile generation process. The bubbles 202 may represent any of the icons 202, 302 disclosed herein, or any other type of icon associated with the profile generation process.

Figure 22A:
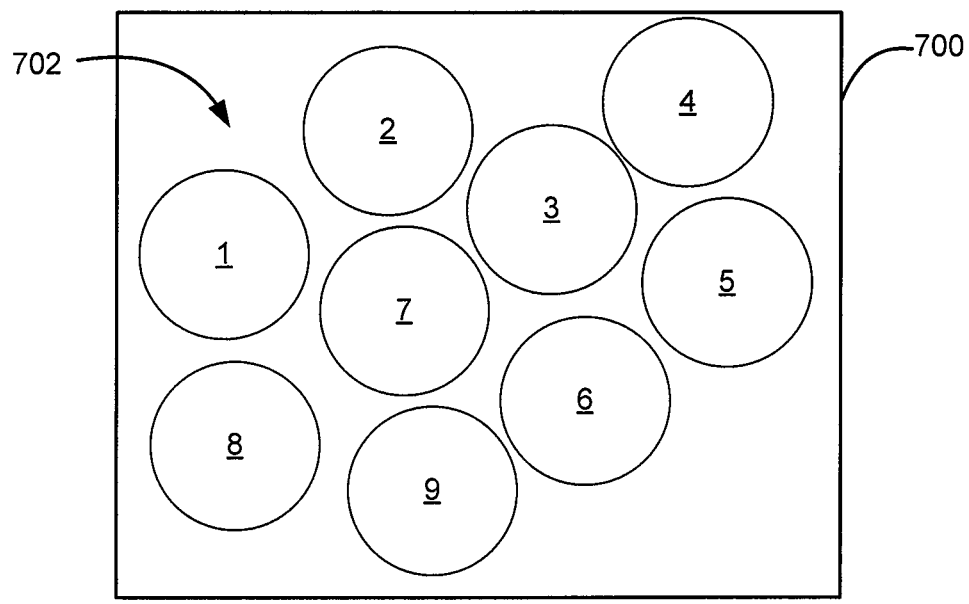
FIGS. 22A-22G are diagrams illustrating exemplary interfaces associated with determining personal preferences using a music service application, in accordance with embodiments.
Figure 22B:
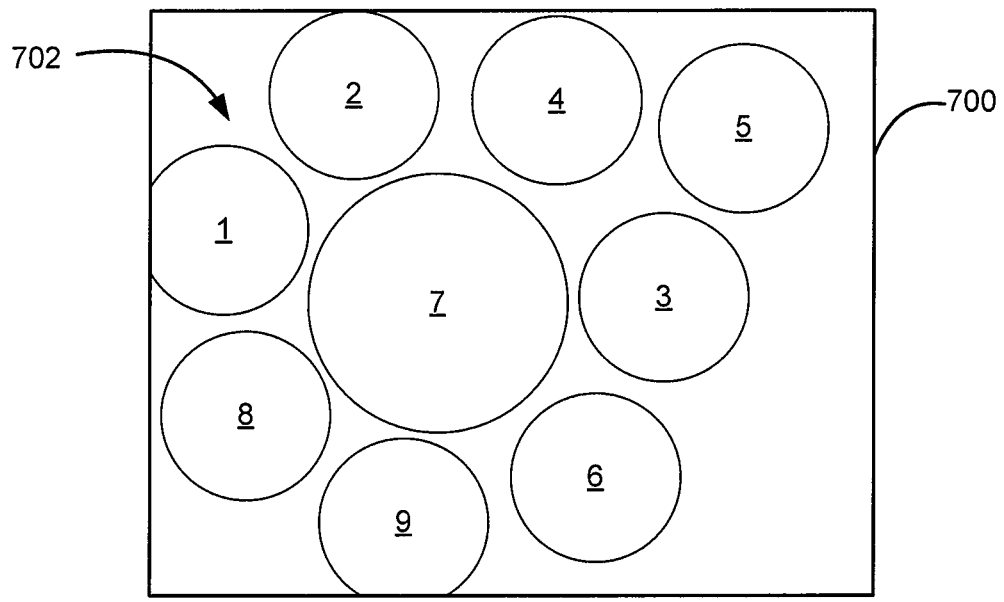
Figure 22C:
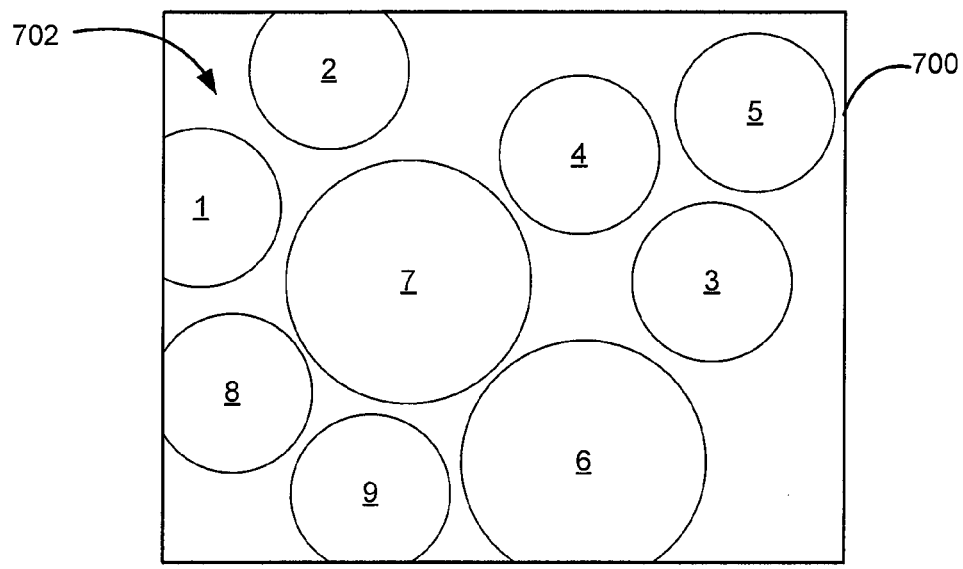
Figure 22D:
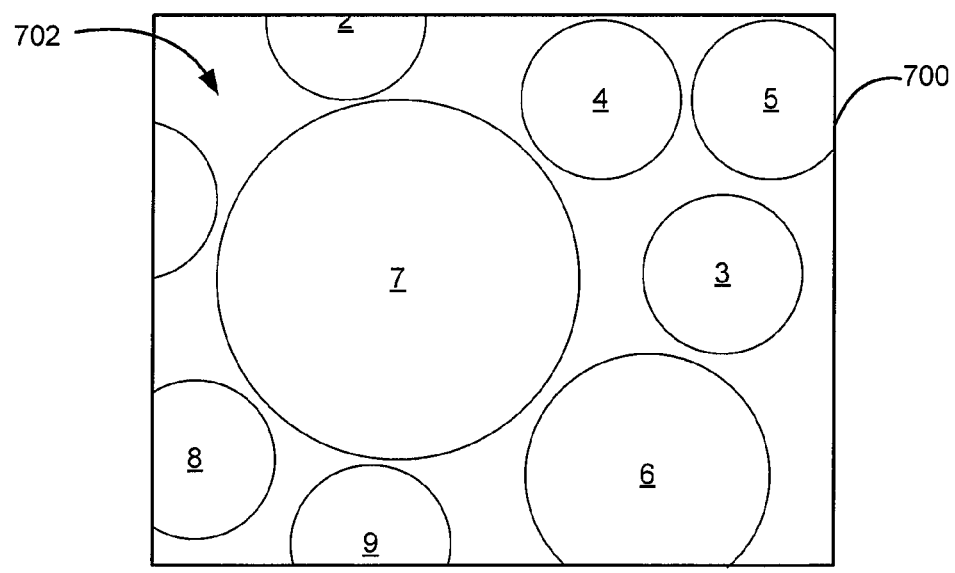
Figure 22E:
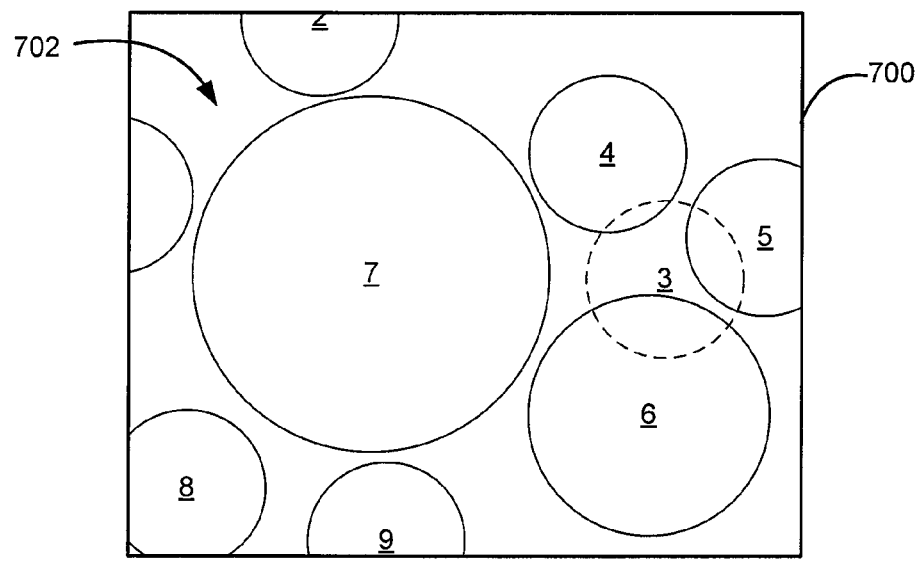
Figure 22F:
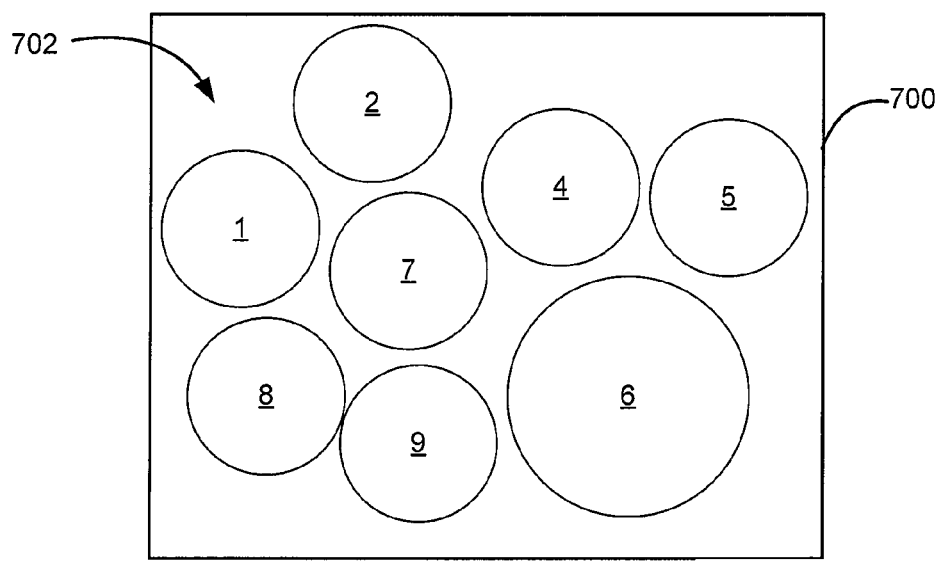

In embodiments, FIG. 22A may represent an initial arrangement of the bubbles 702, all displayed in equal sizes (e.g., a first size). In particular, FIG. 22A may represent the interface 700 prior to receiving any inputs from the user through the user interface of the electronic device (such as, e.g., a touchscreen). FIG. 22B, on the other hand, may represent the interface 700 upon receive a first input from the user. According to FIG. 22B, the first input is received in association with a bubble 7. The first input may be any type of gesture or input including, for example, a touch or tap on an area of the touchscreen corresponding to the bubble 7. In response to the first input, the bubble 7 increases from the first size to a second size. As illustrated in FIG. 22B, the arrangement of bubbles 702 shifts to accommodate the size expansion of the bubble 7. Specifically, the growth of bubble 7 causes the other bubbles 1, 2, 3, 4, 5, 6, 8, and 9 to be pushed backwards or away from the bubble 7, so as to make room for the larger bubble 7. The other bubbles are also re-arranged around the bubble 7 due to the bubbles 702 bumping into, and floating away from, each other.

FIG. 22C may represent the interface 700 upon receiving a second input from the user in association with a bubble 6. For example, the second input may be a tap on an area of the touchscreen corresponding to the bubble 6. In response to the second input, the bubble 6 increases in size from the first size to the second size. As illustrated in FIG. 22C, the arrangement of bubbles 702 shifts again to accommodate the size expansion of the bubble 6. In particular, the growth of bubble 6 causes all of the other bubbles 1, 2, 3, 4, 5, 7, 8, and 9 to be pushed away from the bubble 6, thereby making room for the larger bubble 6. Also, the other bubbles are re-arranged around the bubble 6 due to the bubbles 702 floating and bouncing around the interface 700.

FIG. 22D may represent the interface 700 upon receiving a third input from the user in association with the bubble 7. For example, the third input may be a tap on the area of the touchscreen corresponding to the bubble 7. In response to the third input, the bubble 7 increases in size from the second size to the third size. As illustrated in FIG. 22D, the arrangement of bubbles 702 shifts yet again to accommodate the second size expansion of the bubble 7. This second growth of the bubble 7 causes all of the other bubbles 1, 2, 3, 4, 5, 6, 8, and 9 to be pushed away from the bubble 7, to make room for the very large size of the bubble 7. In addition, the other bubbles are re-arranged around the bubble 7 due to the bubbles 702 drifting away from and/or towards each other.

FIG. 23E may represent the interface 700 upon receiving a fourth input from the user in association with the bubble 3. For example, the fourth input may be a long hold (e.g., for at least three seconds) on an area of the touchscreen corresponding to the bubble 3. In response to the fourth input, the bubble 3 may be popped or deleted from the interface 700, as indicated by the dashed lines, and the arrangement of bubbles 702 is re-arranged to fill in or occupy a space vacated by the popping of bubble 3. As illustrated, the bubbles 4, 5, and 6 may drift into the space once occupied by bubble 3. The other bubbles 1, 2, 3, 7, 8 and 9 may also float towards the vacated space.

FIG. 22F may represent the interface 700 upon receiving a fifth input from the user in association with the bubble 7. For example, the fifth input may be a single tap on the area of the touchscreen corresponding to the bubble 7. In response to the fifth input, the bubble 7 may be shrunk or reduced in size from the third size to the first size. As illustrated in FIG. 22F, the arrangement of bubbles 702 changes to accommodate the shrinking of bubble 7, by moving the other bubbles 1, 2, 3, 4, 5, 6, 8, and 9 closer to the bubble 7 and filling the space once occupied by the very large bubble 7.

In some embodiments, whether to grow or shrink the bubbles 702 in response to an input can depend on the total number of inputs received. For example, a first single tap may cause the bubble 702 to grow by one size (e.g., the bubble 7 in FIG. 22B). A second single tap may cause the bubble 702 to expand an additional size (e.g., the bubble 7 in FIG. 22D). And a third single tap may cause the bubble 702 to shrink down in size (e.g., the bubble 7 in FIG. 22F). In one embodiment, one or more counters may be used to keep track of the number of inputs of a given type received for each bubble 702. The counter(s) may be reset after reaching a predetermined counting threshold. In one embodiment, the counting threshold is three. According to this embodiment, after receiving three consecutive single taps for a given bubble 702, the counter may be reset to 0.

Figure 22G:
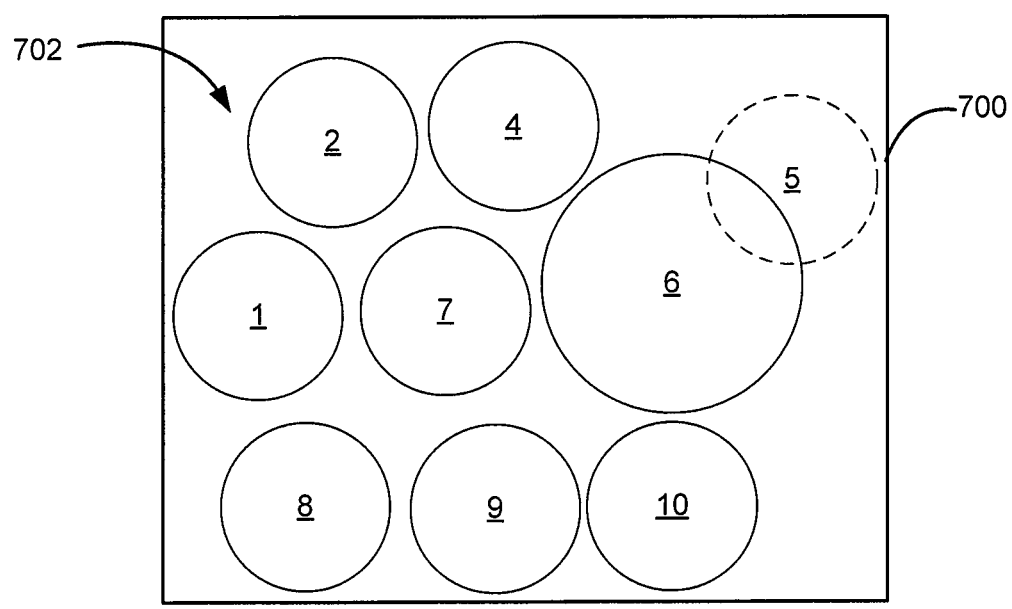

FIG. 22G may represent the interface 700 after receiving a sixth input from the user in association with bubble 5. The sixth input may be a deletion input similar to the fourth input described with respect to FIG. 22E. Thus, in response to receiving the sixth input, the bubble 5 may be deleted. Upon deleting the bubble 5, a new bubble 10 may be added to the clustered arrangement 702. As shown in FIG. 22G, the arrangement of bubbles 702 changes to accommodate the new bubble 10, by moving or pushing the other bubbles 1, 2, 4, 6, 7, 8, and 9 away from the intended location of the bubble 10 to make room for the new bubble.

Figure 25:
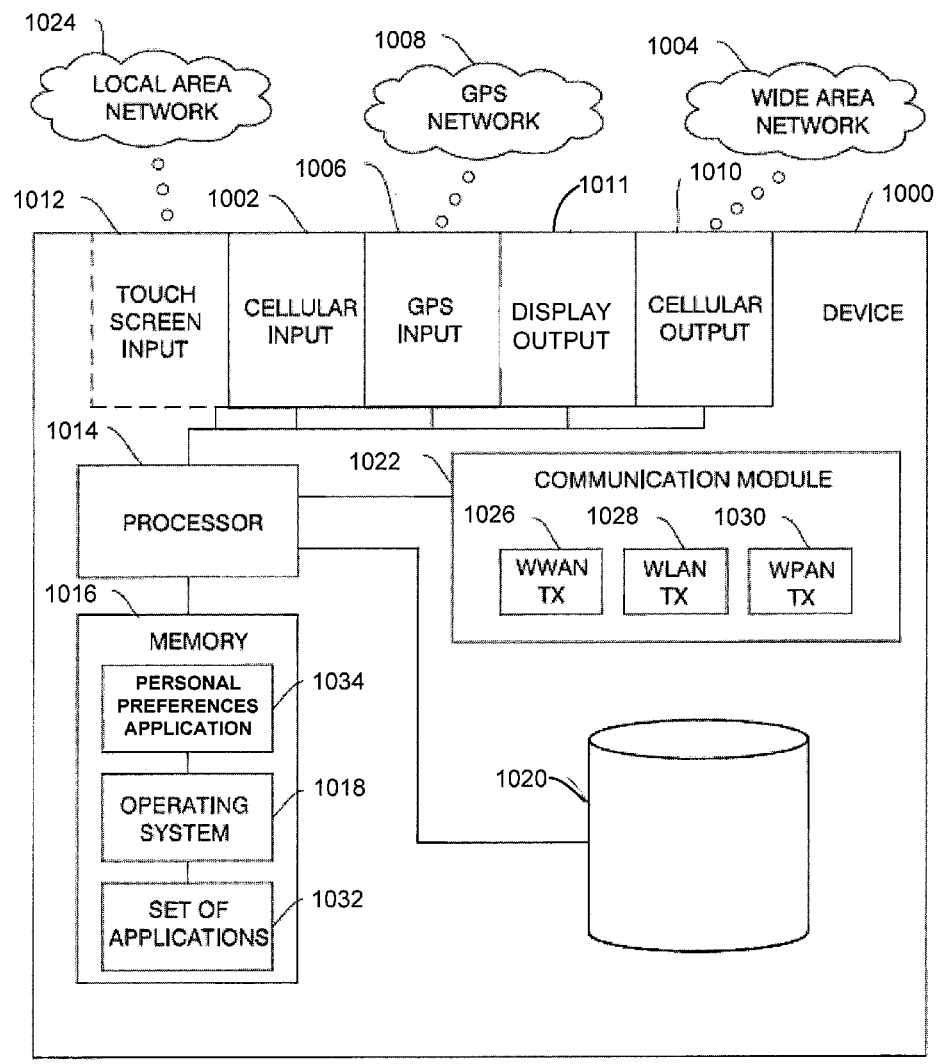
FIG. 25 is a diagram of an exemplary device configured to interface with a music service, in accordance with embodiments.

As shown in FIG. 25, a device 1000, such as the device 104 or the additional devices 110, can comprise a set of ports that can receive input signals or data from, or output signals or data to, other components of a media distribution environment, such as the environment 100 as discussed with respect to FIG. 1. More particularly, a cellular input port 1002 can receive cellular data from a wide area network 1004 (such as various private or public networks), a GPS input port 1006 can receive GPS coordinate data from a GPS network 1008, and a cellular output port 1010 can output data to the wide area network 1004. The device can also comprise a display output port 1011 that can send data to a display (such as, e.g., the display 204) of the device 1000 for displaying graphical user interfaces and other display data. The device 1000 can further comprise an optional touchscreen input port 1012 that can receive contact-based inputs from interactions with a touchscreen by a user operating the device 1000.

The device 1000 can further comprise a processor 1014 communicating with a memory 1016, such as electronic random access memory (RAM), or other forms of transitory or non-transitory computer readable storage mediums, operating under control of or in conjunction with an operating system 1018. The operating system 1018 can be any commercial, open-source, or proprietary operating system or platform. The processor 1014 can communicate with a database 1020, such as a database stored on a local hard drive. While illustrated as a local database in the device 1000, the database 1020 can be separate from the device 1000.

The processor 1014 can further communicate with a communication module 1022, such as a wired or wireless data connection, which in turn communicates with the wide area network 1004. Further, the communication module 1022 can comprise radio transceivers that communicate with a wireless local area network 1024 or other networks, such as various personal area networks. The communication module 1022 can comprise a WWAN transceiver 1026 capable of communicating with the wide area network 1004, a WLAN transceiver 1028 capable of communicating with the local area network 1024, and a WPAN transceiver 1030 capable of communicating with a personal area network (such as a Bluetooth® network). Although not shown in FIG. 25, the communication module 1022 can further include various components for communicating with a GPS network.

The set of ports 1012, 1002, 1006, 1010 of the device 1000 can use the components of the communication module 1022 to connect to the entities of the environment 100. For example, the cellular input port 1002 can receive streaming song data via the WWAN transceiver 1026. The processor 1014 can also communicate with a set of applications 1032 that can be configured to execute control logic and perform data processing to perform the functions and techniques as discussed herein. For example, the set of applications 1032 can comprise a music service application and/or a personal preferences application 1034 that can provide the interfaces as described herein, receive inputs from the user, and facilitate the communication of data among the entities of the environment 100. It should be appreciated that other applications 1032 and functionalities thereof are envisioned.

While FIG. 25 illustrates the device 1000 as a standalone system using a combination of hardware and software, the components of the device 1000 can also be implemented as a software application or program capable of being executed by a conventional computer platform. Likewise, the components of the device 1000 can also be implemented as a software module or program module capable of being incorporated in other software applications and programs. In either case, the components of the device 1000 can be implemented in any type of conventional proprietary or open-source computer language.

Figure 26:
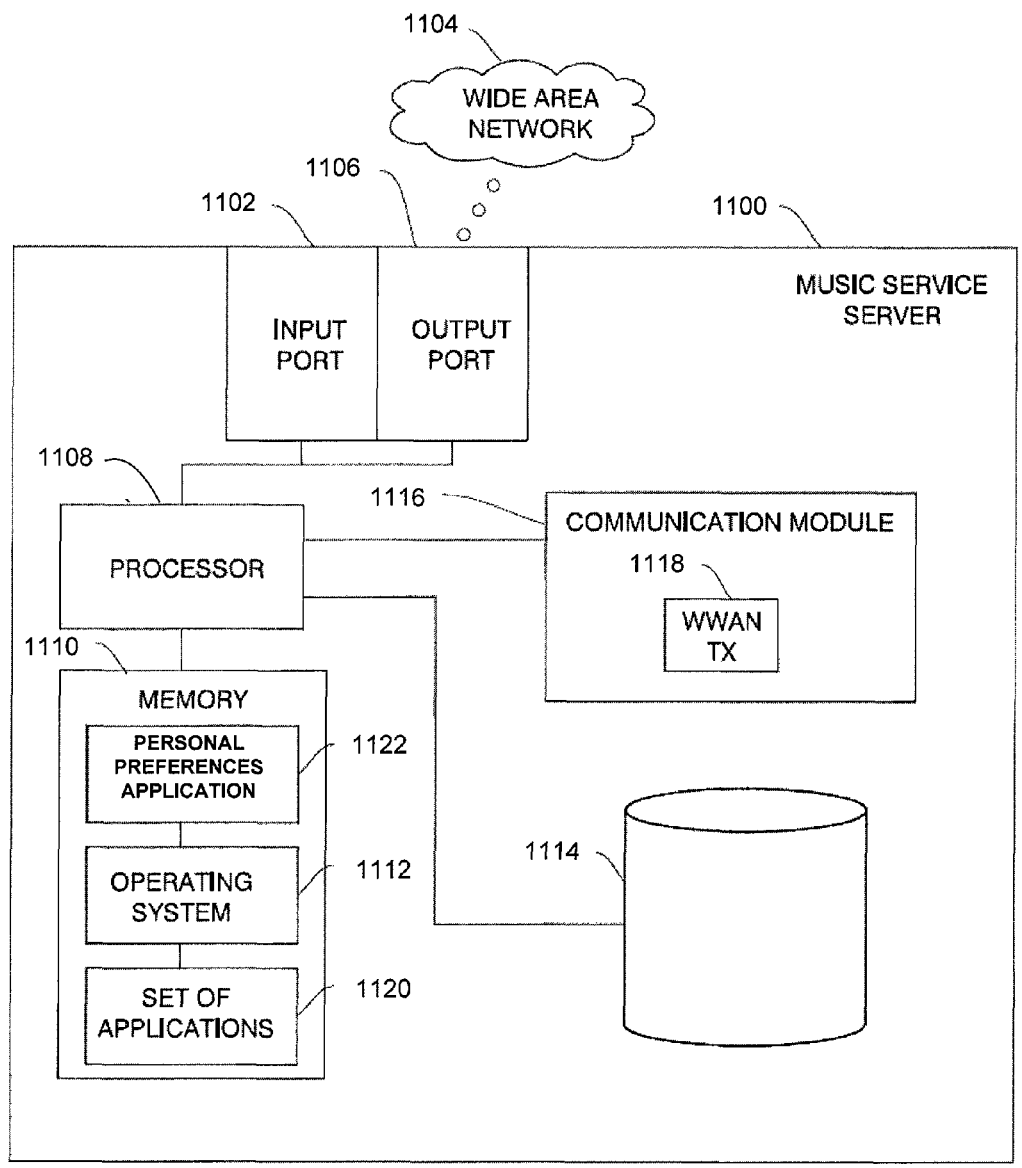
FIG. 26 is a diagram of an exemplary server, in accordance with embodiments.

Referring to FIG. 26, depicted is an exemplary server and components thereof. More particularly, the server 1100 can be the music service server 115 as discussed with respect to FIG. 1. It should be appreciated that FIG. 26 represents a generalized schematic illustration and that other components can be added or existing components can be removed or modified.

As shown in FIG. 26, the server 1100 can comprise a set of ports that can receive input signals or data from, or output signals or data to, other components of a media distribution environment, such as the environment 100 as discussed with respect to FIG. 1. More particularly, an input port 1102 can receive cellular or other types of data from a wide area network 1104 (such as various private or public networks), and an output port 1106 can output data to the wide area network 1104, such as streaming music data.

The server 1100 can further comprise a processor(s) 1108 communicating with a memory 1110, such as electronic random access memory (RAM), or other forms of transitory or non-transitory computer readable storage mediums, operating under control of or in conjunction with an operating system 1112. The operating system 1112 can be any commercial, open-source, or proprietary operating system or platform. The processor 1108 can communicate with a database 1114, such as a database stored on a local hard drive. While illustrated as a local database in the server 1100, the database 1114 can be separate from the server 1100.

The processor 1108 can further communicate with a communication module 1116, such as a wired or wireless data connection, which in turn communicates with the wide area network 1104. In particular, the communication module 1116 can comprise a WWAN transceiver 1118 capable of communicating with the wide area network 1104. The set of ports 1102, 1106 of the server 1100 can use the components of the communication module 1116 to connect to the entities of the environment 100. For example, the input port 1102 can receive personal preference data via the WWAN transceiver 1118, and the output port 1106 can stream audio data in accordance with the personal preference data via the WWAN transceiver 1118. The processor 1108 can also communicate with a set of applications 1120 that can be configured to execute control logic and perform data processing to perform the functions and techniques as discussed herein. For example, the set of applications 1120 can comprise a music service application and/or a personal preferences application 1122 that can support the functionalities of the music service, such as the music profile generation functionalities, as described herein. It should be appreciated that other applications 1120 and functionalities thereof are envisioned.

While FIG. 26 illustrates the server 1100 as a standalone system using a combination of hardware and software, the components of the server 1100 can also be implemented as a software application or program capable of being executed by a conventional computer platform. Likewise, the components of the server 1100 can also be implemented as a software module or program module capable of being incorporated in other software applications and programs. In either case, the components of the server 1100 can be implemented in any type of conventional proprietary or open-source computer language.

FIG. 27 is a flowchart of a method 1200 for an electronic device (such as the device 105) to generate a music profile and/or compile personal preferences for a user of a music service. It should be appreciated that the functionalities of the method 1200 can be implemented with the electronic device executing an application and interfacing with a remote server, such as the music service server 115. In embodiments, the application may be the music service application or a portion thereof, such as a profile generation aspect of the application. In some embodiments, the application may be a computer program stored on a non-transitory computer readable medium that is executable by a processor of the device. Further, according to embodiments, the electronic device includes a display and a user interface (such as the touchscreen 204), and a processor (such as the processor 1014) communicatively coupled to the display and the user interface.

The method 1200 can begin when the electronic device of a user of a music service initiates the music service. In some embodiments, the method 1200 can begin upon receiving an indication, from the user and/or the music service, that the user is new to the music service, does not have an active account or customer profile, and/or has not yet registered with the music service. In other embodiments, the method 1200 includes receiving data and/or an instruction related to generating a user profile and/or collecting personal preferences of a user. For example, when presented with a log-in screen, the user may have selected a "New User" option, which causes display of the profile generation interfaces described herein.

At step 1208 of the method 1200, the electronic device simultaneously displays, on the display, a first group of a plurality of images in a clustered arrangement (e.g., as shown in FIG. 22A). The plurality of images can have any shape, size, or color, and can be any type of graphical image, including icons, symbols, logos, pictures, etc. In the exemplary embodiment of FIG. 22A, the plurality of images are icons having a substantially similar circular shape and a substantially uniform initial size (e.g., a first size). According to embodiments, each of the plurality of icons can be assigned to a respective one of a plurality of values. In some embodiments, each icon includes text and/or graphics representing the value assigned to the icon, as shown in FIGS. 2-18. According to some aspects, the plurality of values are music-related values. In the exemplary embodiment of FIG. 3, each of the plurality of values is a respective one of a plurality of music genres. In the exemplary embodiment of FIG. 11, each of the plurality of values is a respective one of a plurality of music artists.

In some embodiments, the plurality of icons is divided into predetermined groups based on the values associated with the icons. In some embodiments, the first group of icons may be associated with values that are more likely to be selected by the new user based on popularity and/or ratings information collected from existing users of the music service. And a second group of icons may be associated with values that are less likely to be selected by the new user based on popularity and/or ratings information. For example, the second group of icons may include lesser-known music genres, like "punk," "reggae," or 'bluegrass." And the first group of icons may include well-known music genres, like "rock," "country," and "pop." In other embodiments, the first group of icons may be associated with broader categories, and the second group of icons may be associated with narrower categories or sub-categories related to one or more of the broader categories. For example, one of the first group of icons may be associated with the music genre value "indie." And the second group of icons may be associated with the music genre values "modern indie," "90s indie," and "80s indie." In another example, one of the first group of icons may be associated with a first rock music artist, and the second group of icons may be associated with additional rock music artists that are similar to the first rock music artist. In other embodiments, there may be only one group of icons displayed on the display during profile generation.

The method 1200 continues from step 1208 to step 1210, where the electronic device receives, via the user interface, a first input in association with a first icon of the first group of icons. The first input indicates a preference for the value assigned to the first icon. For example, a user that prefers the "world" music genre may select the icon that includes text and/or graphics representing world music. Upon receiving the first input at step 1210, the method 1200 continues to step 1212, which includes determining a total number of first inputs received in association with the first icon, including the first input received at step 1210. In embodiments, the processor may perform a counting function to count or keep track of the number of first inputs received in association with each of the plurality of icons. For example, a counter may be used to perform this counting function.

According to embodiments, the processor selects at least one of a first size, a second size larger than the first size, or a third size larger than the second size, depending on the total number of first inputs received. The size of the first icon may reflect, or be proportional to, the magnitude of the user's preference for the value associated with the first icon. For example, the first icon may be initially displayed in the first size (e.g., as shown by the icon 7 in FIG. 7A). The processor and/or music service application may associate the first size with a neutral or ambivalent preference and therefore, assign a magnitude of, for example, zero to value associated with the first icon. Upon receiving a first user selection of the first icon, the first icon may be expanded from the first size to the second size (e.g., as shown by the icon 207 in FIG. 19). The second size may be associated with a positive preference or liking and therefore, the processor may assign a magnitude of, for example, one to the value associated with the first icon. And upon receiving a second user selection of the first icon, the first icon may be expanded from the second size to the third size (e.g., as shown by the icon 7 in FIG. 7D). The third size may be associated with a strong preference or love and therefore, the processor may assign a magnitude of, for example, two to the value associated with the first icon. In some embodiments, upon receiving a third user selection of the first icon, the first icon may be reduced from the third size to the first size (e.g., as shown by the icon 7 in FIG. 22F). In some embodiments, the counter may be automatically reset to zero upon reaching a count of three, and the counting function may restart with the next input received in association with the first icon.

More specifically, in some embodiments, at step 1214, the processor determines whether the number determined at step 1212 exceeds one. If the number does not exceed one (e.g., the total number of first inputs equals one), the method 1200 continues to step 1216, where the processor selects the second size for the first icon. If the number does exceed one (e.g., the total number of first inputs equals two or more), at step 1218 the processor determines whether the number determined at step 1212 exceeds two. If the number does not exceed two (e.g., the total number of first inputs equals two), the method 1200 continues to step 1220, where the processor selects the third size for the first icon. If the number does exceed two (e.g., the total number of first inputs equals three), at step 1222 the processor selects the first size for the first icon. The method 1200 then continues to step 1224, where the counter for the number of first inputs is reset to zero.

From steps 1216, 1220, or 1224, the method 1200 continues to step 1226. At step 1226, the size of the first icon is adjusted in response to the first input. More specifically, the first icon is expanded, or reduced to, the size selected by the processor in steps 1216, 1220, or 1222 based on the total number of first inputs received thus far. At step 1228, the remaining icons of the first group of icons are redistributed, within the clustered arrangement, to accommodate the size adjustment of the first icon (e.g., as shown in FIG. 22E). For example, the remaining icons may be moved apart to make room for a size expansion, or moved closer together to fill in space emptied by a size reduction. The remaining icons may also shift into new positions after bumping and jostling other icons, as described above.

At step 1230, the electronic device may receive, via the user interface, a second input in association with a second icon of the first group of icons, where the second input indicates a negative preference or dislike. In response to the second input, the processor may assign a magnitude of negative one (−1) to the value assigned to the second icon. In embodiments, both the first input and the second input can be a contact-based input detected by the touchscreen of the electronic device, but the second input may be a different type of gesture than the first input. For example, the second input may be a double-tap/touch gesture, and the first input may be a single-tap/touch gesture. As another example, the first input may be a single tap, and the second input may be a long hold. In some embodiments, the second input can also be received in associated with the first icon discussed above, or any other icon within the first group of icons. Likewise, prior to receiving the second input, the first input may be received in association with the second icon to expand, or reduce, the second icon.

At step 1232, in response to the second input, the electronic device deletes the second icon from the clustered arrangement. At step 1234, the remaining icons of the first group of icons are redistributed within the clustered arrangement to fill a space emptied by the deletion of the second icon, for example, as shown in FIG. 22E. In some embodiments, at step 1236, upon deleting the second icon, the electronic device may add, to the clustered arrangement, a third icon from the second group of icons, for example, as shown in FIG. 22G. At step 1238, upon adding the third icon, the electronic device may redistribute, within the clustered arrangement, the icons of the first group (e.g., the other icons displayed in the interface) to accommodate the added third icon. For example, the other icons may be moved apart and/or moved closer together within the clustered arrangement to make room for the new icon. In another embodiment, at steps 1239-1241, new icons may be added and/or displayed items deleted, upon user selection of a more option displayed on the display (for example, the "More Artists" option 315 in FIG. 12), as described herein. For example, in steps 1239-1241 the new icons may be selected from the second group of icons, where the second group of icons is associated with values related to the value assigned to the first icon, and all but the first icon may be deleted.

FIG. 13 is a flowchart of a method 1300 for an electronic device (such as the device 105) to generate a music profile and/or determine personal preferences for a user of a music service. It should be appreciated that the functionalities of the method 1300 can be implemented with the electronic device executing an application and interfacing with a remote server, such as the music service server 115. In embodiments, the application may be a music service application or a portion thereof, such as a profile generation aspect of the application. In some embodiments, the application may be a computer program stored on a non-transitory computer readable medium that is executable by a processor of the device. Further, according to embodiments, the electronic device includes a display and a user interface (such as the touchscreen 204), and the processor (such as the processor 1014) communicatively coupled to the display and the user interface.

The method 1300 can begin when the electronic device of a user of a music service initiates the music service. In some embodiments, the method 1300 can begin upon receiving an indication, from the user and/or the music service, that the user is new to the music service, does not have an active account or customer profile, and/or has not yet registered with the music service. In other embodiments, the method 1300 includes receiving data and/or an instruction related to generating a user profile and/or collecting personal preferences of a user. For example, when presented with a log-in screen, the user may have selected a "New User" option, which causes display of the profile generation interfaces described herein.

At step 1305 of the method 1300, the electronic device receives, from the server, a first plurality of icons assigned to a respective one of a plurality of categories. According to embodiments, each icon may include text and/or graphics representing the assigned category. In some embodiments, the plurality of categories can include a plurality of music genres. At step 1310, the electronic device simultaneously displays, on the display, the first plurality of icons in a clustered arrangement (e.g., as shown in FIG. 22A).

At step 1315, the electronic device receives a plurality of inputs, via the user interface, corresponding to selected icons of the first plurality of icons. Each of the inputs may include at least one of a plurality of input types, such as, e.g., a deletion input, a size expansion input, and/or a size reduction input. And each input type may cause a display status of the selected icon to change. For example, the display status of a given icon may be a deleted status, an expanded status, a reduced status, a first size status, a second size status, a third size status, etc., as shown in FIG. 227. In some embodiments, the size expansion input includes a first size expansion input and a second size expansion input, where the first size expansion input increases a size of the selected icon from a first, or initial, size to a second size (e.g., as shown by the icons 207, 209 in FIG. 19), and the second size expansion input increases the size of the selected icon from the second size to a third size (e.g., as shown by the icons 205, 207 in FIG. 19). Further, according to embodiments, each input type and/or the resulting display status of the selected icon may indicate a specific preference level of the user for the category assigned to the icon. For example, an icon that is deleted may indicate a negative user preference level for the category assigned to the icon. Likewise, an icon having the first size may indicate an ambivalent user preference level for the assigned category, an icon having the second size may indicate a first positive user preference level for the assigned category, and an icon having the third size may indicate a second positive user preference level higher than the first positive user preference level for the assigned category.

In embodiments, at step 1320, the electronic device identifies, via the processor, an input type for each of the plurality of inputs received in connection with the selected icons. According to embodiments, the input type may be determined based on the gesture detected by the user interface, or touchscreen, in connection with the selected icon. The type of gesture assigned to implementing each input type may be predetermined and/or user-configurable. According to some embodiments, a long hold gesture (e.g., tap and hold for at least three seconds) may result in the deletion input type, and a single-tap gesture may result in the size expansion input type or the size reduction input type, depending on the number of consecutive single-taps received for the icon. Other combinations of gestures are contemplated, and this disclosure is not limited to those examples listed herein.

According to some embodiments, the method 1300 includes at step 1325, where upon identifying the input type for each received input, the processor determines whether the input is the deletion type input. If the answer is yes (e.g., the gesture associated with the input is a long hold), the method 1300 continues to step 1330, where the processor associates the negative user preference level with the category assigned to the icon. If the answer at step 1325 is no (e.g., the gesture associated with the input is a single-tap), the method 1300 continues to step 1335, where the processor determines whether the input type is a first size expansion input. If the answer is yes (e.g., the input is a first single-tap), the method 1300 continues to step 1340, where the processor selects the second size for the selected icon, thereby expanding the size of the icon, and at step 1345, the processor associates the first positive user preference level with the category assigned to the selected icon. If the answer is no at step 1335 (e.g., the input is not the first single-tap), the method 1300 continues to step 1350, where the processor determines whether the input type is the second size expansion input. If the answer is yes (e.g., the input is a second single-tap), the method 1300 continues to step 1355, where the processor selects the third size for the selected icon, thereby expanding the size of the icon, and at step 1360, the processor associates the second positive user preference level to the category assigned to the selected icon. If the answer is no at step 1350 (e.g., the input is not the second single-tap and/or is a third single-tap), the method 1300 continues to step 1365, where the processor selects the first size for the selected icon, thereby reducing the size of the icon, and at step 1370, the processor associates the ambivalent preference level with the category assigned to the selected icon.

From steps 1330, 1345, 1360, or 1370, the method 1300 continues to step 1375. At step 1375, the electronic device adjusts, on the display, the display status of each selected icon based on the corresponding input type determined at step 1320. At step 1380, the electronic device sends the user preference levels associated with each of categories to the music service server for processing. Based on the user preference levels received from the electronic device, the music service server can determine which categories the user prefers or dislikes and the relative preferences of the preferred categories. Using this information, the music service server can identify a number of sub-categories that corresponds to each category that the user prefers and can assign a second plurality of icons to represent the sub-categories. In some embodiments, the categories are music genres, and the sub-categories are music artists associated with the music genres preferred by the user. Further, each of the second plurality of icons can include text and/or graphics that represent the assigned sub-category. The number of sub-categories assigned to each category can depend on the user preference level for the category. For example, if the second positive user preference level is associated with the "pop" music genre and the first positive user preference level is associated with the "world" music genre, the second plurality of icons will include a larger number of icons associated with pop music artists and a smaller number of icons associated with world music artists. Other strategies for determining the number of types of sub-categories may be used, including, for example, finding sub-categories that satisfy both of the selected categories, or a combination of the selected categories (e.g., world pop artists), or any known techniques for evaluating user preference.

Once the user has finished entering preferences for the categories displayed in the first plurality of icons, the method 1300 continues to step 1385, where the electronic device receives, from the server, the second plurality of icons associated with the plurality of sub-categories. At step 1390, the electronic device displays the second plurality of icons by replacing the first plurality of icons with the second plurality of icons within the clustered arrangement on the display, for example, as shown in FIG. 9-11. In embodiments, the method 1300 includes step 1391, where the electronic device receives a second plurality of inputs corresponding to selected ones of the second plurality of icons. Each of the second plurality of inputs includes at least one of the plurality of input types. Further, at step 1392, the electronic device, using the processor, selects one of the first size, the second size, the third size, or deletion for each selected icon based on the input type received in association with that icon. At step 1393, for each selected icon, the processor associates one of the user preference levels with the sub-category assigned to the icon based on the input type received in association with that icon, using a process similar to that described at steps 1325 to 1370. At step 1394, the electronic device adjusts, on the display, the display status of each selected icon based on the corresponding input type, similar to step 1375. The display status of each icon indicates a user preference level for the sub-category assigned to the icon, as discussed above.

In embodiments, the user preference levels for the categories and the sub-categories may be stored in the music service server in association with other account information for the user. Further, the user preference levels may be retrieved from the server and used by the music service server to generate appropriate music suggestions to the user. In some embodiments, the method 1300 may include step 1395, where the electronic device receives one or more music objects, from the server, for playback on the electronic device. The one or more music objects may be identified by the music service server based on the user preference levels associated with the plurality of sub-categories and the plurality of categories. For example, the one or more music objects may include at least one of an album, a song, or a playlist. In some embodiments, the music objects may be presented on the electronic device as music selection options or suggestions for playback.

Figure 29:
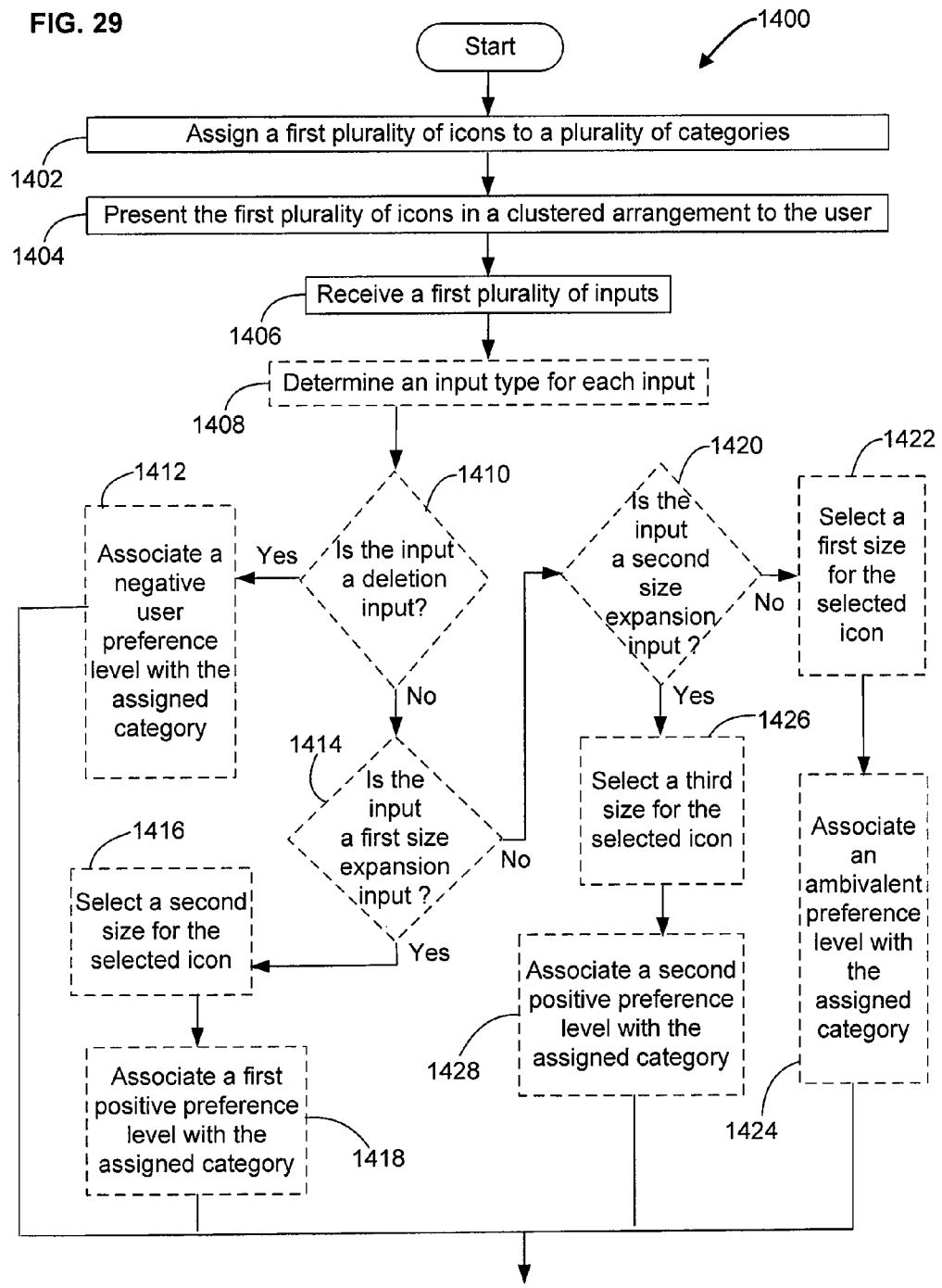
FIG. 29 is a flow diagram depicting techniques for determining personal preferences of a user, in accordance with embodiments.

FIG. 29 is a flowchart of a method 1400 for a server (such as the music service server 115) to generate a music profile or determine personal preferences for a user of a music service. It should be appreciated that the functionalities of the method 1400 can be implemented with the server executing an application and interfacing with a user device, such as the device 105. In embodiments, the application may be a music service application or a portion thereof, such as a profile generation aspect of the application. In some embodiments, the application may be a computer program stored on a non-transitory computer readable medium that is executable by a processor of the server.

The method 1400 can begin when the electronic device of a user of a music service initiates the music service. In some embodiments, the method 1400 can begin upon determining that the user is new to the music service, does not have an active account or customer profile, and/or has not yet registered with the music service. For example, the method 1400 may include receiving data and/or an instruction related to generating a user profile and/or collecting personal preferences of a user from the device of the user. For example, when presented with a log-in screen, the user may have selected a "New User" option, which causes display of the profile generation interfaces described herein.

At step 1402, the server assigns each of a first plurality of icons to a respective one of a plurality of categories. According to embodiments, each icon may include text and/or graphics representing the assigned category. In some embodiments, the plurality of categories can include a plurality of music genres. At step 1404, the server presents the first plurality of icons in a clustered arrangement to a user. For example, the server may send the first plurality of icons to the user device for display on a device of the user.

At step 1406, the server receives a first plurality of user inputs from the user device. Each user input corresponds to a select one of the first plurality of icons and includes at least one of a plurality of input types, such as, e.g., a deletion input, a size expansion input, and/or a size reduction input. And each input type may cause a presentation status of the selected icon to change. For example, the presentation status of a given icon may be a deleted status, an expanded status, a reduced status, a first size status, a second size status, a third size status, etc. In some embodiments, the size expansion input includes a first size expansion input and a second size expansion input, where the first size expansion input increases a size of the selected icon from a first, or initial, size to a second size, and the second size expansion input increases the size of the selected icon from the second size to a third size. Further, according to embodiments, each input type and/or the resulting presentation status of the selected icon may indicate a specific preference level of the user for the category assigned to the icon. For example, an icon that is deleted may indicate an ambivalent user preference level for the category assigned to the icon. Likewise, an icon having the first size may indicate a first positive user preference level for the assigned category, an icon having the second size may indicate a second positive user preference level for the assigned category, and an icon having the third size may indicate a second positive user preference level higher than the first positive user preference level for the assigned category.

According to embodiments, at step 1408, the server, using the processor, determines an input type for each input received in connection with the selected icons. According to embodiments, the input type may be determined based on the gesture detected by the user interface of the user device in connection with the selected icon. The type of gesture assigned for implementing each input type may be predetermined and/or user-configurable. According to some embodiments, a long-hold gesture may result in the deletion input type, and a single-tap gesture may result in the size expansion input type. Other combinations of gestures are contemplated, and this disclosure is not limited to those examples listed herein. In some embodiments, upon detecting a user input, the user device sends data related to the detected gesture to the server, and the server identifies the input type assigned to the detected gesture. In other embodiments, the user device identifies the input type based on the detected gesture and sends the identified input type to the server.

According to embodiments, from step 1408, the method 1400 continues to step 1410, where for each received input, the processor of the server determines whether the input type is a deletion input. If the answer is yes (e.g., the gesture associated with the input is a long hold), the method 1400 continues to step 1412, where the processor associates the negative user preference level with the category assigned to the icon. If the answer at step 1410 is no (e.g., the gesture associated with the input is a single tap), the method 1400 continues to step 1414, where the processor determines whether the input type is a first size expansion input. If the answer is yes (e.g., the input is a first single tap), the method 1400 continues to step 1416, where the processor selects the second size for the selected icon, and at step 1418, the processor associates the first positive user preference level with the category assigned to the selected icon. If the answer is no at step 1414 (e.g., the input is not the first single tap), the method 1400 continues to step 1420, where the processor determines whether the input type is the second size expansion input. If the answer is no (the input is not a second single tap and/or is a third single tap), the method 1400 continues to step 1422, where the processor selects the first size for the selected icon, and at step 1424, the processor associates the ambivalent user preference level with the category assigned to the selected icon. If the answer is yes at step 1420 (e.g., the input is the second single tap), the method 1400 continues to step 1426, where the processor selects the third size for the selected icon and at step 1428, the processor associates the second positive user preference level to the category assigned to the selected icon.

From steps 1412, 1418, 1424, or 1428, the method 1400 continues to step 1430. At step 1430, the server adjusts the presentation status of each selected icon based on the corresponding input type determined at step 1408, and presents the selected icons with the adjusted presentation statuses (e.g., expanded, reduced, deleted, etc.) to the user's device for display thereon. Based on the presentation status for each selected icon, and the corresponding user preference levels for the categories assigned to the icon, the server can determine which categories the user prefers or dislikes and the relative preferences between the preferred categories.

Once the user has completed the category selection process (e.g., FIGS. 2-9, at step 1432 the server uses the category preference information to identify a number of sub-categories for each category that the user prefers. In some embodiments, the categories are music genres, and the sub-categories are music artists associated with the music genres preferred by the user, for example, as shown in FIGS. 2-18. At step 1434, the server assigns a respective one of a second plurality of icons to each sub-category. In embodiments, each of the second plurality of icons can include text and/or graphics that represent the assigned sub-category, for example, as shown in FIG. 20. The number of sub-categories assigned to each category can depend on the user preference level for the category. For example, if the second user preference level is associated with the "rock" music genre and the first user preference level is associated with the "R&B" music genre, the second plurality of icons will include a larger number of icons associated with rock music artists and a smaller number of icons associated with R&B music artists.

At step 1436, the server presents the second plurality of icons to the user in place of the first plurality of icons within the clustered arrangement, thereby causing the second plurality of icons to be displayed on the user device, for example, as shown in FIGS. 9-11. In some embodiments, the method 1400 further includes step 1438, where the server receives, from the user device, a second plurality of inputs corresponding to selected ones of the second plurality of icons. Each of the second plurality of inputs includes at least one of the plurality of input types. Further, at step 1440, the server, using the processor, selects one of the first size, the second size, the third size, or deletion for each selected icon based on the input type received in association with that icon. At step 1442, for each selected icon, the processor associates one of the user preference levels with the sub-category assigned to the icon based on the input type received in association with that icon and using a process similar to that described at steps 1408 to 1428. At step 1444, the server adjusts the presentation status of each selected icon based on the corresponding input type, similar to step 1430. The presentation status of each icon indicates a user preference level for the sub-category assigned to the icon, as discussed above.

In embodiments, the user preference levels for the categories and the sub-categories may be stored in a memory device of the server in association with other account information for the user. Further, the user preference levels may be retrieved from the memory device and used by the server to generate appropriate music suggestions to the user. In some embodiments, the method 1400 may include step 1446, where the server provides one or more music objects, to the user device, for playback on the device. The one or more music objects may be identified by the server based on the user preference levels associated with the plurality of sub-categories and the plurality of categories. For example, the one or more music objects may include at least one of an album, a song, or a playlist. In some embodiments, the music objects may be presented on the user device as music selection options or suggestions for playback.

Thus, it should be clear from the preceding disclosure that the systems and methods offer improved music profile creation techniques, particularly for new users of a music service. The systems and methods advantageously provide new users with an intuitive graphical user interface that presents music profile categories as interactive icons. Additionally, the systems and methods advantageously enable the user to manipulate each icon in accordance with the user's personal preference for the associated music profile category.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method of compiling personal preferences of a user using an electronic device, the electronic device including a display, a user interface, and a processor communicatively coupled to the display and the user interface, the method comprising:
   simultaneously displaying, on the display, a plurality of moving icons in a randomized and clustered arrangement, each of the plurality of moving icons being assigned to a respective one of a plurality of values;
   receiving, via the user interface, a first input in association with a first moving icon of the plurality of moving icons, the first input indicating a preference for the value assigned to the first moving icon;
   adjusting, on the display, a size of the first moving icon in response to the first input;
   redistributing, within the randomized and clustered arrangement, the moving icons of the plurality of moving icons to accommodate the size adjustment of the first moving icon;

receiving, via the user interface, a second input in association with a second moving icon of the plurality of moving icons, the second input indicating a dislike for the value assigned to the second moving icon;

deleting, from the randomized and clustered arrangement, the second moving icon in response to the second input; and redistributing, within the randomized and clustered arrangement, the moving icons of the plurality of moving icons to fill a space emptied by the deletion of the second moving icon.

2. The method of claim 1, further comprising:

upon receiving the first input, determining a total number of first inputs received in association with the first moving icon; and selecting at least one of a first size, a second size larger than the first size, or a third size larger than the second size, depending on the total number of first inputs received.

3. The method of claim 2, wherein, in response to the total number of first inputs received being one, adjusting a size of the first moving icon includes expanding the first moving icon from the first size to the second size.

4. The method of claim 2, wherein, in response to the total number of first inputs received being two, adjusting a size of the first moving icon includes expanding the first moving icon from the second size to the third size.

5. The method of claim 2, wherein, in response to the total number of first inputs received being three, adjusting a size of the first moving icon includes reducing the first moving icon from the third size to the first size.

6. The method of claim 5, further comprising: restarting a counting of the total number of first inputs in response to receiving three first inputs.

7. The method of claim 2, wherein the size of the first moving icon is proportional to a magnitude of the preference for the value associated with the first moving icon.

8. The method on claim 1, further comprising:

receiving an indication to display additional values related to the value assigned to the first moving icon;

upon receiving the indication, deleting the moving icons of the plurality of moving icons except for the first moving icon, so that only the first moving icon is displayed in the randomized and clustered arrangement; and in response to the deletion, adding additional moving icons to the randomized and clustered arrangement, each of the additional moving icons being assigned a respective one of the additional values.

9. The method of claim 1, wherein each of the plurality of moving icons has a substantially similar shape.

10. The method of claim 9, wherein each of the plurality of moving icons has a circular shape.

11. The method of claim 1, wherein the plurality of values are music-related values.

12. The method of claim 11, wherein each of the plurality of values is a respective one of a plurality of music genres.

13. The method of claim 11, wherein each of the plurality of values is a respective one of a plurality of music artists.

14. The method of claim 1, wherein each moving icon includes one or more of text and graphics representing the value assigned to the moving icon.

15. An electronic device, comprising:

a user interface capable of receiving inputs from a user;
a display capable of presenting information to the user; and a processor coupled to the user interface and the display, and configured to perform operations comprising:

causing the display to simultaneously display a first group of moving icons of a plurality of moving icons in a randomized and clustered arrangement, each of the plurality of moving icons being assigned to a respective one of a plurality of values;

receiving, via the user interface, a first input in association with a first moving icon of the first group of moving icons, the first input indicating a preference for the value assigned to the first moving icon;

adjusting, on the display, a size of the first moving icon in response to the first input;

redistributing, within the randomized and clustered arrangement, the moving icons of the first group to accommodate the size adjustment of the first moving icon;

receiving, via the user interface, a second input in association with a second moving icon of the first group of moving icons, the second input indicating a dislike for the value assigned to the second moving icon;

deleting, from the randomized and clustered arrangement, the second moving icon in response to the second input; and redistributing, within the randomized and clustered arrangement, the remaining icons of the first group to fill a space emptied by the deletion of the second moving icon.

16. The electronic device of claim 15, wherein the user interface includes touch sensitive technology.

17. The electronic device of claim 15, wherein the first input is associated with a single tap, and the second input is associated with a tap and hold.

18. The electronic device of claim 15, wherein the processor is further configured to perform additional operations comprising:

upon receiving the first input, determining a total number of first inputs received in association with the first moving icon; and selecting at least one of a first size, a second size larger than the first size, or a third size larger than the second size, depending on the total number of first inputs received.

19. The electronic device of claim 18, wherein, in response to the total number of first inputs received being one, the processor being configured to perform operations comprising adjusting a size of the first moving icon includes the processor being configured to perform operations comprising expanding the first moving icon from the first size to the second size.

20. The electronic device of claim 18, wherein, in response to the total number of first inputs received being two, the processor being configured to perform operations comprising adjusting a size of the first moving icon includes the processor being configured to perform operations comprising expanding the first moving icon from the second size to the third size.

21. The electronic device of claim 18, wherein, in response to the total number of first inputs received being three, the processor being configured to perform operations comprising adjusting a size of the first moving icon includes the processor being configured to perform operations comprising reducing the first moving icon from the third size to the first size.

22. The electronic device of claim 21, wherein the processor is further configured to perform additional operations comprising: restarting a counting of the total number of first inputs in response to receiving three first inputs.

23. The electronic device of claim 18, wherein the size of the first moving icon is proportional to a magnitude of the preference for the value associated with the first moving icon.

24. The electronic device on claim 15, wherein the processor is further configured to perform additional operations comprising:
- receiving an indication to display additional values related to the value assigned to the first moving icon;
- upon receiving the indication, deleting the moving icons of the plurality of moving icons except for the first moving icon, so that only the first moving icon is displayed in the randomized and clustered arrangement; and
- in response to the deletion, adding additional moving icons to the randomized and clustered arrangement, each of the additional moving icons being assigned a respective one of the additional values.

25. The electronic device of claim 15, wherein each of the plurality of moving icons has a substantially similar shape.

26. The electronic device of claim 25, wherein each of the plurality of moving icons has a circular shape.

27. The electronic device of claim 15, wherein the plurality of values are music-related values.

28. The electronic device of claim 27, wherein each of the plurality of values is a respective one of a plurality of music genres.

29. The electronic device of claim 27, wherein each of the plurality of values is a respective one of a plurality of music artists.

30. The electronic device of claim 15, wherein each moving icon includes one or more of text and graphics representing the value assigned to the icon.

31. A non-transitory computer readable storage medium storing data comprising instructions for compiling personal preferences of a user using an electronic device, the electronic device including a display, a user interface, and a processor communicatively coupled to the display and the user interface, and the instructions executable by the processor to:
- cause the display to simultaneously display a plurality of moving icons in a randomized and clustered arrangement, each of the plurality of moving icons being assigned to a respective one of a plurality of values;
- receive, via the user interface, a first input in association with a first moving icon of the plurality of moving icons, the first input indicating a preference for the value assigned to the first moving icon;
- adjust, on the display, a size of the first moving icon in response to the first input;
- redistribute, within the randomized and clustered arrangement, the moving icons of the plurality of moving icons to accommodate the size adjustment of the first moving icon;
- receive, via the user interface, a second input in association with a second moving icon of the plurality of moving icons, the second input indicating a dislike for the value assigned to the second moving icon;
- delete, from the randomized and clustered arrangement, the second moving icon in response to the second input; and
- redistribute, within the randomized and clustered arrangement, the moving icons of the plurality of moving icons to fill a space emptied by the deletion of the second moving icon.

32. The non-transitory computer readable storage medium of claim 31, wherein the data comprises additional instructions that are executable by the processor to:
- upon receiving the first input, determine a total number of first inputs received in association with the first moving icon; and
- select at least one of a first size, a second size larger than the first size, or a third size larger than the second size, depending on the total number of first inputs received.

33. The non-transitory computer readable storage medium of claim 32, wherein, in response to the total number of first inputs received being one, the instructions that are executable by the processor to adjust a size of the first moving icon include instructions that are executable by the processor to expand the first moving icon from the first size to the second size.

34. The non-transitory computer readable storage medium of claim 32, wherein, in response to the total number of first inputs received being two, the instructions that are executable by the processor to adjust a size of the first moving icon include instructions that are executable by the processor to expand the first moving icon from the second size to the third size.

35. The non-transitory computer readable storage medium of claim 32, wherein, in response to the total number of first inputs received being three, the instructions that are executable by the processor to adjust a size of the first moving icon include instructions that are executable by the processor to reduce the first moving icon from the third size to the first size.

36. The non-transitory computer readable storage medium of claim 35, wherein the data comprises additional instructions that are executable by the processor to restart a counting of the total number of first inputs in response to receiving three first inputs.

37. The non-transitory computer readable storage medium of claim 32, wherein the size of the first moving icon is proportional to a magnitude of the preference for the value associated with the first moving icon.

38. The non-transitory computer readable storage medium of claim 31, wherein the data comprises additional instructions that are executable by the processor to:
- receive an indication to display additional values related to the value assigned to the first moving icon;
- upon receiving the indication, delete the moving icons of the plurality of moving icons except for the first moving icon, so that only the first moving icon is displayed in the randomized and clustered arrangement; and
- in response to the deletion, add additional moving icons to the randomized and clustered arrangement, each of the additional moving icons being assigned a respective one of the additional values.

39. The computer readable storage medium of claim 31, wherein each moving icon includes one or more of text and graphics representing the value assigned to the moving icon.

* * * * *